United States Patent
Zhu et al.

(10) Patent No.: US 8,306,531 B2
(45) Date of Patent: Nov. 6, 2012

(54) SYSTEM AND APPARATUS FOR MOBILE CS USERS TO ACCESS IMS NETWORK AND REGISTRATION METHOD FOR ACCESSING

(75) Inventors: Dongming Zhu, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 947 days.

(21) Appl. No.: 12/254,145

(22) Filed: Oct. 20, 2008

(65) Prior Publication Data
US 2009/0093249 A1 Apr. 9, 2009

Related U.S. Application Data

(63) Continuation of application No. PCT/CN2007/001230, filed on Apr. 16, 2007.

(30) Foreign Application Priority Data

Apr. 20, 2006 (CN) .......................... 2006 1 0075931

(51) Int. Cl.
*H04W 4/00* (2009.01)
(52) U.S. Cl. .................. 455/435.1; 455/432.3; 455/433; 455/428
(58) Field of Classification Search .................. 455/428, 455/432.3, 433, 435.1; 370/328, 352–356, 370/395.52
See application file for complete search history.

(56) References Cited

U.S. PATENT DOCUMENTS

| | | | |
|---|---|---|---|
| 7,359,373 B2 * | 4/2008 | Kuusinen et al. ............. | 370/352 |
| 2002/0110104 A1 | 8/2002 | Surdila et al. | |
| 2003/0027569 A1 | 2/2003 | Ejzak | |
| 2003/0027595 A1 | 2/2003 | Ejzak | |
| 2004/0122934 A1 | 6/2004 | Westman et al. | |
| 2004/0153667 A1 | 8/2004 | Kastelewicz et al. | |

(Continued)

FOREIGN PATENT DOCUMENTS

CN 1282167 1/2001

(Continued)

OTHER PUBLICATIONS

3rd Generation Partnership Project Technical Specification 33.203, V6.9.0, Dec. 2005.

(Continued)

*Primary Examiner* — Kamran Afshar
*Assistant Examiner* — Dung Lam
(74) *Attorney, Agent, or Firm* — Brinks Hofer Gilson & Lione

(57) ABSTRACT

The present invention provides a system and apparatus for a mobile CS user to access an IMS network and a registration method for accessing. The network under the present invention comprises an IMS network for providing IMS services and a CS access network. The network contains a Register Proxy Function (RPF) entity, which comprises a first interface for communicating with the IMS network and a second interface for communicating with the CS access network. The RPF entity is adapted to map a CS registration event which is originated by the mobile CS user through the second interface to an IMS registration event, and initiate registration to the IMS network through the first interface on behalf of the mobile CS user. The technical solution under the present invention enables a mobile CS user to be registered to an IMS network practicably so that the CS user can enjoy rich IMS services.

22 Claims, 19 Drawing Sheets

U.S. PATENT DOCUMENTS

| | | | |
|---|---|---|---|
| 2004/0190498 A1* | 9/2004 | Kallio et al. | 370/352 |
| 2004/0205212 A1 | 10/2004 | Huotari et al. | |
| 2007/0100981 A1* | 5/2007 | Adamczyk et al. | 709/223 |
| 2007/0238466 A1* | 10/2007 | Buckley et al. | 455/445 |

FOREIGN PATENT DOCUMENTS

| | | |
|---|---|---|
| CN | 1468008 | 1/2004 |
| CN | 1650656 | 8/2005 |
| CN | 100596084 C | 3/2010 |
| WO | WO-00/33523 | 6/2000 |
| WO | WO 2005/020619 A1 | 3/2005 |

OTHER PUBLICATIONS

European Office Action dated Dec. 1, 2009, which issued during prosecution of corresponding European Patent Application No. 07 720 332.1.

European Office Action dated Nov. 6, 2009, which issued during prosecution of corresponding European Patent Application No. 07 720 332.1.

Chinese Office Action dated Jun. 27, 2008, which issued during the prosecution of corresponding Chinese Patent Application No. 200610079313.

Written Opinion of the International Searching Authority issued in corresponding PCT Patent Application No. PCT/CN2007/001230, mailed Jul. 12, 2007.

Office Action issued in corresponding Chinese Patent Application No. 2006100759313, mailed Jun. 27, 2008.

$3^{rd}$ Generation Partnership Project, "Technical Specification Group Services and System Aspects; 3G Security; Security Principles and Objectives" (Release 4), 3GPP TS 33.120. V4.0.0, Mar. 2001.

$3^{rd}$ Generation Partnership Project, "Technical Specification Group Services and System Aspects; 3G Security; Network Domain Security; IP Network Layer Security" (Release 7), 3GPP TS 33.210. V7.0.0, Dec. 2005.

$3^{rd}$ Generation Partnership Project, "Technical Specification Group Services and System Aspects; 3G Security; Security Architecture" (Release 7), 3GPP TS 33.102. V7.0.0, Dec. 2005.

$3^{rd}$ Generation Partnership Project, "Technical Specification Group Services and System Aspects; 3G Security; Access Security for IP-based Services" (Release 7), 3GPP TS 33.203. V7.1.0, Mar. 2006.

$3^{rd}$ Generation Partnership Project, "Technical Specification Group Core Network and Terminals; IP Multimedia (IM) Subsystem Cx and Dx Interfaces; Signalling Flows and Message Contents" (Release 7), 3GPP TS 29.228. V7.1.0, Mar. 2006.

$3^{rd}$ Generation Partnership Project, "Technical Specification Group Radio Access Network; UTRAN Lu Interface RANAP Signalling" (Release 7), 3GPP TS 25.413. V7.1.0, Mar. 2006.

$3^{rd}$ Generation Partnership Project, "Technical Specification Group Core Network and Terminals; Mobile Application Part (MAP) Specification" (Release 7), 3GPP TS 29.002. V7.3.0, Mar. 2006.

$3^{rd}$ Generation Partnership Project, "Technical Specification Group Core Network and Terminals; IP Multimedia Call Control Protocol Based on Session Initiation Protocol (SIP) and Session Description Protocol (SDP)" Stage 3 (Release 7), 3GPP TS 24.229. V7.3.0, Mar. 2006.

$3^{rd}$ Generation Partnership Project, Technical Specification Group Core Network and Terminals; Mobile Radio Interface Layer 3 Specification; Core Network Protocols; Stage 3 (Release 7), 3GPP TS 24.008. V7.3.0, Mar. 2006.

$3^{rd}$ Generation Partnership Project, "Technical Specification Group Core Network and Terminals; Signalling Flows for the IP Multimedia Call Control Based on Session Initiated Protocol (SIP) and Session Description Protocol (SDP)" Stage 3 (Release 5), 3GPP TS 24.228. V5.14.0, Dec. 2005.

$3^{rd}$ Generation Partnership Project, "Technical Specification Group Services and System Aspects; IP Multimedia Subsystem (IMS)" Stage 2 (Release 7), 3GPP TS 23.228. V7.3.0, Mar. 2006.

$3^{rd}$ Generation Partnership Project, "Technical Specification Group Services and System Aspects; 3G Security; Security Threats and Requirements" (Release 4), 3GPP TS 21.133. V4.1.0, Dec. 2001.

$3^{rd}$ Generation Partnership Project, "Technical Specification Group Services and System Aspects; Service Requirements for the Internet Protocol (IP) Multimedia Core Network Subsystem" Stage 1 (Release 7), 3GPP TS 22.228. V7.3.0, Dec. 2005.

Global System for Mobile Communications, "$3^{rd}$ Generation Partnership Project: Technical Specification Group Core Network and Terminals; Numbering, Addressing and Identification" (Release 6), 3GPP TS 23.003. V6.9.0, Mar. 2006.

$3^{rd}$ Generation Partnership Project, "Technical Specification Group Core Network and Terminals; Location Management Procedures" (Release 7), 3GPP TS 23.012. V7.0.0, Mar. 2006.

"$3^{rd}$ Generation Partnership Project; Technical Specification Group Services and System Asp; IP Multimedia Subsystem (IMS) Centralized Services; Stage 2 (Release 8)" 3GPP TS23.292 vol. 1.0 Global System for Mobile Communication. Nov. 2007.

Rosenberg, J. et al. "SIP: Session Initiation Protocol" Network Working Group. The Internet Society. Jun. 2002.

* cited by examiner

SYSTEM AND APPARATUS FOR MOBILE CS USERS TO ACCESS IMS NETWORK AND REGISTRATION METHOD FOR ACCESSING

CROSS REFERENCE TO RELATED APPLICATIONS

The present application is a continuation of International Patent Application Serial No. PCT/CN2007/001230, filed Apr. 16, 2007, which claims the benefit of Chinese Patent Application Serial No. 200610075931.3, filed Apr. 20, 2006, both of which are hereby incorporated by reference in their entireties.

FIELD OF THE INVENTION

The present invention relates to communication technologies, and in particular, to a technology for a non-IP Multimedia Subsystem (IMS) user to access an IMS network.

BACKGROUND OF THE INVENTION

The Public Land Mobile Network (PLMN) defined by the 3rd Generation Partnership Project (3GPP) can be logically divided into two parts: a Core Network (CN) and an Access Network (AN). The CN can be subdivided into a Circuit Switched (CS) domain, a Packet Switched (PS) domain, and an IMS. In different CN, a user must use a different access mode.

(i) CS Domain and User Access

The CS domain provides CS services for users, including voice, CS data, and fax. Typical entities of the CS domain include: a Mobile Switching Center (MSC), adapted to handle call signaling and complete call routing; a Wireless Media Gateway (WMG), adapted to set up media connections and convert voice codes; a Visitor Location Register (VLR), adapted to store information about the current location of a user and the service data; a Home Location Register (HLR), adapted to store subscription data of a user and the information about the current serving VLR; an Equipment Identity Register (EIR), adapted to store user equipment identities; and an Authentication Center (AuC), adapted to generate authentication data.

To ensure the services in the CS domain to be accessible to users, the 3GPP protocol defines a mechanism for a mobile CS user to access a CN. Through this mechanism, the network can obtain the user location information and implement network access security protection.

The network needs to handle access requests when a mobile CS user powers on a Mobile Equipment (ME), roams to a new MSC/VLR service area, updates the location periodically, or invokes a service.

A network operator can decide to use or not to use certain access-related processes, for example, authentication process, encryption process, process of allocating a Temporary Mobile Subscriber Identity (TMSI), in different access operations according to specific policies.

A typical access process of a 3G CS user is shown in FIG. 1. A Mobile Equipment (ME) sends a location update request to the Radio Network Controller (RNC), and sends an authentication information request to the HLR/AUC through an MSC/VLR in turn; afterward, the HLR/AUC returns an authentication request message to the MSC/VLR, RNC and ME in turn.

The process for a CS user to access a network further includes a process of starting security protection.

The identities for use in an access process of a CS user include: Mobile Subscriber ISDN Number (MSISDN), International Mobile Subscriber Identity (IMSI), and TMSI. The composition of an IMSI is shown in FIG. 2. An IMSI uniquely identifies a user in a global mobile network, and is bound to the MSISDN of the user at the time of subscription.

As shown in FIG. 2, an IMSI consists of three parts: Mobile Country Code (MCC), Mobile Network Code (MNC), and Mobile Subscriber Identification Number (MSIN). The MCC is promulgated by the ITU-T and applied globally. An MNC is allocated by the country that governs the MCC according to the actual conditions, and is expressed by two or three digits. An MSIN is allocated by an operator who holds the MCC and MNC. A National Mobile Subscriber Identity (NMSI) is expressed as "MNC+MSIN".

As shown in FIG. 3, an MSISDN is allocated according to the ITU E.164 numbering plan and E.213 specifications, and consists of three parts: Country Code (CC), National Destination Code (NDC), and Mobile Subscriber Identification Number (MSIN). A CC is an international toll area code, and is promulgated by the ITU-T and applied globally. An NDC is defined by the country that governs the CC and allocated according to the conditions of the country. A mobile operator may have more than one NDC, for example, 135-139 held by China Mobile, and 130-134 held by China Unicom. A national number is defined by the operator holding "CC+NDC". A national number is expressed as "NDC+SN".

An MSISDN should be able to serve as a Global Title (GT) of the Signaling Connection Control Part (SCCP) to locate the HLR of the user. In the addressing process, the HLR that serves the user can be located according to the "CC+NDC" of the number, or optionally, plus part of the Subscriber Number (SN). The identity of the HLR related to user registration may be an HLR number compliant with the E.164 specifications, or an HLR ID. The format of an HLR number is the same as that of an MSISDN. An HLR ID consists of several parts of an IMSI, namely, the first few digits of "MCC+MNC+MSIN".

The TMSI is a locally effective identity in the MSC/VLR service area. It is used with a Location Area Identity (LAI). Therefore, the network operator can stipulate that a TMSI should be reallocated for every access. To prevent an eavesdropper from determining the user location through a unique ID, the GSM/WCDMA network generally allocates a TMSI to the user who accesses an MSC/VLR service area initially.

The CS user who accesses the network should be authenticated. The authentication process includes: obtaining an authentication vector (AV) through the MSC/VLR (MSC is combined with VLR), and performing bidirectional authentication with the user.

The process for an MSC/VLR to obtain an AV includes: when an MSC/VLR of the CN receives a user location update request for access, if the MSC/VLR determines that the user needs authentication, the MSC/VLR requests an AV from the HLR/AUC (HLR is combined with AUC). The AUC generates several groups of AVs arranged sequentially according to the IMSI of the user. An AV includes five elements (RAND, AUTN, CK, IK, RES). The HLR returns all the generated AVs to the MSC/VLR through a response.

After obtaining an AV, the MSC/VLR performs a bidirectional authentication process with the user, including: after receiving the AV groups, the MSC/VLR selects an intact AV, removes the response (RES), and sends it to the RNC to require initiation of authentication. The RNC removes the cipher key (CK) and the integrity key (IK) of the remaining AVs, and sends an authentication request to the ME (USIM). The USIM in the ME can calculate out the CK, IK and RES in the AV group by using different algorithms shared with the network according to the key (K) which is allocated at the time of subscription and shared in the AUC of the network as well as the received random number (RAND). According to the RAND, authentication token (AUTN) and the shared key (K), the ME calculates out the MAC, and compares the value with the MAC value received from the AUTN. If the two values are the same, the ME returns the calculated RES to the MSC/VLR. The MSC/VLR compares the value with the RES stored in the AV, and, if the two values are the same, determines that the ME passes the authentication and is legal.

In a GSM system, the access process of a GSM user is similar to that of a CS user in a 3G system such as CDMA system. As shown in FIG. 4, the differences between the access process of a GSM user and that of a 3G CS user include:

The GSM system has no ME for network authentication, so the AV contains no AUTN parameter;

The GSM system has no data integrity protection, so the AV contains no IK parameter; and A cipher key (Kc) of the GSM system contains only 64 digits while a CK used in the 3G system contains 128 digits, and the encryption algorithm applied in the 3G system is more intense.

The signed response (SRES) of a GSM system differs from the RES of a 3G system in algorithm and length.

The access process of a 3G and 2G CS user described above reveals that a security mechanism is set for the mobile CS domain to provide security assurance to some extent. The security mechanism of a 3G user is an enhancement of the GSM user security mechanism. That is, the 3G security mechanism is a smooth evolution from the 2G security mechanism.

The foregoing is an access process of the CS network and CS user. The following describes an access process of the IMS network and IMS user.

The IMS is a subsystem that is overlaid on the existing PS domain and supports IP multimedia services. It is intended to provide rich multimedia services such as audio, video, text, interactive session, or combination thereof. The IMS uses the Session Initiation Protocol (SIP), and is independent of access.

As shown in FIG. 5, the function entities in an IMS include: a Call Session Control Function (CSCF) entity that controls user registration and session, an Application Server (AS) that provides various service logic control functions, and a Home Subscriber Server (HSS) that manages subscription data altogether. A user accesses the IMS through the Proxy-CSCF (P-CSCF) of a current visited location. The Serving-CSCF (S-CSCF) in the home domain controls triggering of sessions and services and interacts with the AS about service control.

In an IMS network, each user who subscribes to the IMS service owns one or more private user identities allocated by the home network operator for the purpose of registration, authorization, management and charging. Each IMS user owns one or more public user identities intended for use in service session processes and for identifying the user during communication with other users.

FIG. 6 shows the IMS subscription and the relationship between the public user identity and the private user identity in an IMS. One private user identity corresponds to one or more public user identities.

In an IMS network, the access process of an IMS user can be divided into: initial registration of the user, re-registration of the user, deregistration of the user, re-authentication initiated by the network, deregistration initiated by the network, and event subscription after registration.

In the registration initiated by a user, these parameters must be carried in the request: an IP Multimedia Public Identity (IMPU), an IP Multimedia Private Identity (IMPI), and a home domain name of the user. Other parameters such as the authentication capability and IP address of a User Equipment (UE) may also be carried.

As shown in FIG. 7, the initial registration process initiated by an IMS user includes:

The user uses the IMPU, IMPI, contact address and home domain name stored in the ISIM module to construct a SIP Register message. The message also carries the information about the type and ID of the user access network, the supported encryption, integrity algorithm options, port required for setting up a Security Association (SA) with the P-CSCF, and timeout duration. Afterward, the user sends the message to the default address of the P-CSCF found previously by the UE in the P-CSCF discovery process.

After receiving the message, the P-CSCF stores the user identity and other necessary information, queries for the address of the Interrogating-CSCF (I-CSCF) of the home domain according to the home domain name, and constructs a new Register message which carries the information about the visited network and sends the message to the I-CSCF address indicated by the query result.

According to the private identity of the user, the I-CSCF queries the HSS for the registration state of the user. If the user is not registered, the I-CSCF selects an S-CSCF for handling the Register request of the user. After selecting an S-CSCF, the I-CSCF sends the Register request to the S-CSCF for further processing.

After receiving the Register message, the S-CSCF checks and determines that the user is registered initially, and requests the HSS to allocate an authentication vector (AV) to the user. The composition of the AV is the same as that of a 3G user AV, and is a quintuplet vector. After receiving the allocation result of the HSS, the S-CSCF selects a group of vectors from the SIP 401 message, removes the XRES in the vectors and sends the vectors to the P-CSCF through the I-CSCF.

After removing the CK and IK in the AV, the P-CSCF selects a preferred algorithm according to the encryption and integrity algorithm capabilities of the P-CSCF and the UE, and sets the parameters of the security association in the P-CSCF. The P-CSCF puts such parameters into the 401 message, and initiates an authentication challenge to the UE.

The UE calculates out the CK, IK and RES according to the Authentication Key (K) shared with the network and the received RAND, and authenticates the network in the same way as in a 3G CS domain. Then it negotiates the security association according to the relevant parameters returned by the P-CSCF. After negotiation of the security association, the signaling at the UE and the network side uses the port defined by the security association for communication. After calculating the RES required by the network, the UE needs to construct a new Register message. After encryption and integrity protection, the message is sent to the P-CSCF through the security channel connected to the P-CSCF.

The P-CSCF decrypts the received message. If the message is resolved successfully, the network and the UE have completed encryption and integrity protection. Afterward, the P-CSCF sends the authentication result to the S-CSCF through the I-CSCF. After receiving the Register message, the S-CSCF compares the RES in the message with the RES stored previously. If they are the same, the authentication succeeds. After the authentication is completed, the S-CSCF notifies the HSS of authentication success, and downloads user data from the HSS. Afterward, the S-CSCF sends a 200

OK message to the UE, indicating that the registration succeeds. The message carries the registration lifetime measured in seconds, which is specified by the network. Besides, the S-CSCF may initiate third-party registration to the Application Server (AS) specified in the triggering conditions according to the triggering conditions in the user data.

After receiving a 200 OK response, the P-CSCF initiates a process of subscribing to the registration event packet of the UE to the S-CSCF. After the subscription succeeds, the S-CSCF returns the registration state to the P-CSCF.

After receiving the 200 OK response, the UE initiates a process of subscribing to the registration event packet of the UE to the S-CSCF. After the subscription succeeds, the S-CSCF returns the registration state to the UE.

After completion of the registration, the following processes may be performed for a user who accesses the IMS network:

(1) The re-registration process initiated by the user is shown in FIG. 8. Before expiry of the registration lifetime, the UE initiates re-registration to the network, and indicates support of integrity protection to the network. As shown in the figure, the S-CSCF judges whether to re-authenticate the user. If no authentication is required, the S-CSCF returns a 200 OK response to the UE.

(2) The deregistration process initiated by the user is: In the Register message, the UE set "expires" (a parameter that indicates the registration lifetime) to 0. The S-CSCF notifies the HSS that the user is deregistered. If the UE has no other triggering conditions of the unregistered state, the S-CSCF will no longer store information about the user.

(3) As shown in FIG. 9, the re-registration process initiated by an IMS network includes:

The S-CSCF in the network initiates re-registration of the UE. Re-registration is to send a SIP NOTIFY message to the UE. After the user initiates re-registration, the network decides whether to re-authenticate the user according to the operation policy.

After sending a NOTIFY message, the S-CSCF shortens the registration lifetime of the corresponding IMPI of the user. In this period, if the UE initiates no re-registration process, the S-CSCF initiates a deregistration process.

(4) The deregistration process initiated by the IMS network is shown in FIG. 10. When the user data is deleted from the HSS, or deregistration is triggered by an internal event (re-registration timer timeout) of the S-CSCF, the IMS network initiates a deregistration process. In the deregistration process, different parameters are carried in the NOTIFY message, depending on whether the IMS network expects the UE to initiate registration again.

With the development of network communication technologies, integration of an IMS network with a CS network becomes a megatrend in the industry. To meet the increasing IP multimedia application requirements, the 3GPP proposes an IMS of an all-IP service network architecture on the basis of a packet bearer network. The integrated network is intended to shield the user access mode and improve the multimedia communication experience. Therefore, a solution is required as regards how an existing CS user accesses an IMS network.

Radio interface CS signaling (for example, GSM 04.08 signaling) is used to register a mobile CS user at the CS domain, but the SIP signaling based on a PS network is used to register a user in the IMS. Therefore, a CS user is unable to be registered to the IMS directly. In the prior art, therefore, it is impossible for a CS user to access an IMS network through registration in the IMS network.

SUMMARY OF THE INVENTION

The embodiments of the present invention provide a system and apparatus for a mobile CS user to access an IMS network, and a registration method for accessing, thus enabling a mobile CS user to be registered to the IMS network conveniently and access the IMS network to obtain rich services.

A system for a mobile CS user to access an IMS network provided in an embodiment of the present invention includes an IMS network for providing IMS services, and a CS access network, and further includes:

a Register Proxy Function (RPF) entity, further including a first interface for communicating with the IMS network and a second interface for communicating with the CS access network. The RPF entity is adapted to map a CS registration event which is originated by the mobile CS user through the second interface to an IMS registration event, and initiate registration to the IMS network through the first interface on behalf of the mobile CS user.

A registration method for enabling a mobile CS user to access an IMS network provided in an embodiment of the present invention includes:

mapping, by an RPF entity, a CS registration event to an IMS registration event after detecting a CS registration event initiated by a mobile CS user; and initiating, by the RPF entity, a registration process to the IMS network through the IMS registration event.

An RPF entity provided in an embodiment of the present invention includes a first interface for communicating with the IMS network and a second interface for communicating with the CS access network, and specifically includes:

a registration event detecting unit, adapted to detect a CS registration event initiated by a mobile CS user through the second interface;

a mapping unit, adapted to map the CS registration event detected by the registration event detecting unit to an IMS registration event; and an IMS registering unit, adapted to register to the IMS network on behalf of the mobile CS user through the first interface according to the mapping result of the mapping unit.

In the foregoing technical solution provided by an embodiment of the present invention, an RPF entity is added to the network, so that a mobile CS user can be registered to the IMS network as required, thus enabling a CS user to access the IMS network to enjoy rich IMS services.

The embodiments of the present invention make it practicable for an operator to unify and simplify the core network and reduce the operation cost effectively.

The embodiments of the present invention enable the mobile CS domain to serve as an access technology of the IMS network, and enable a mobile CS user to access an IMS network. Integrated access from a CS network to an IMS network is of enormous significance with respect to reducing operation costs and launching consistent services quickly.

DETAILED DESCRIPTION OF THE EMBODIMENTS

The embodiments of the present invention enable registration of a mobile CS user who needs to access an IMS network, and specifically, register a CS user who subscribes to the IMS service to the IMS network. The operations performed in the user registration process include: detecting a registration event; mapping the domain ID of a CS user to an IMS domain ID, mapping the signaling of a CS registration process to the signaling of a SIP registration process, mapping the additional part of an IMS registration process as against the CS domain to the CS domain, and identification of registered CS users and special operations performed by each entity in the IMS network. The embodiments of the present invention provide a perfect registration process that enables a mobile CS user to access an IMS network in view of the foregoing operations that need to be performed in the registration process.

Figure 1:
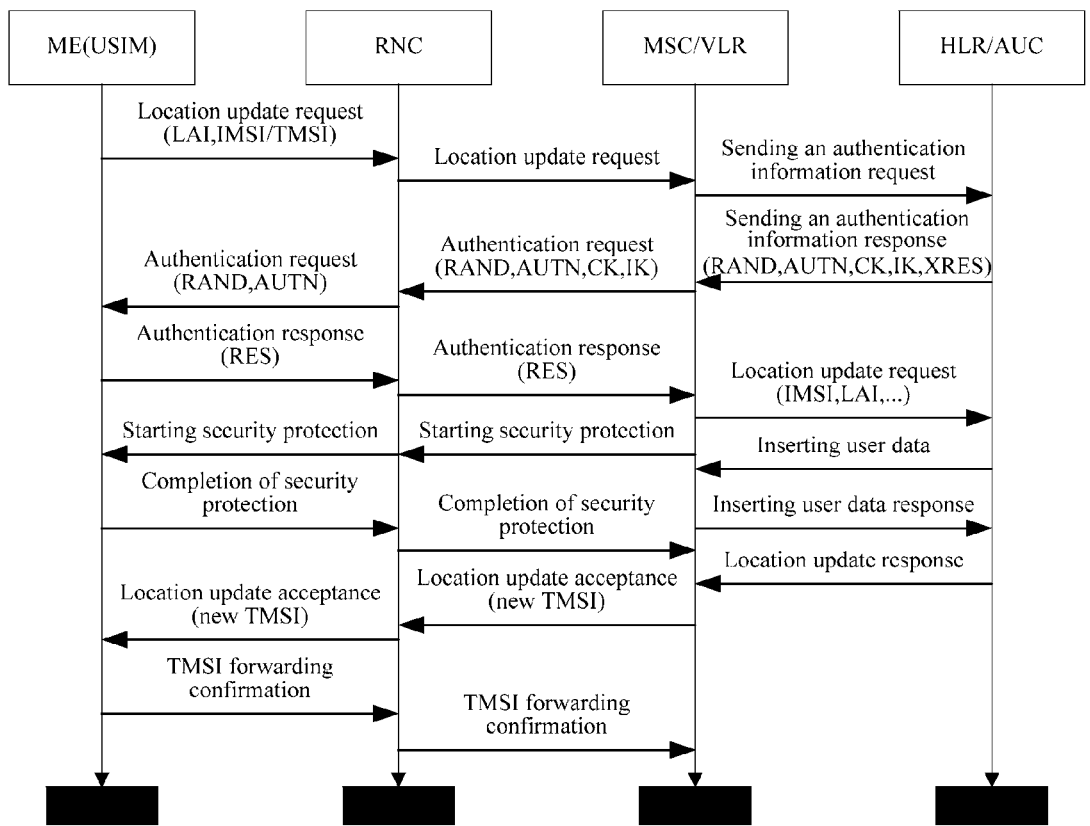
FIG. 1 is a flowchart of registering a mobile CS user.
Figure 2:
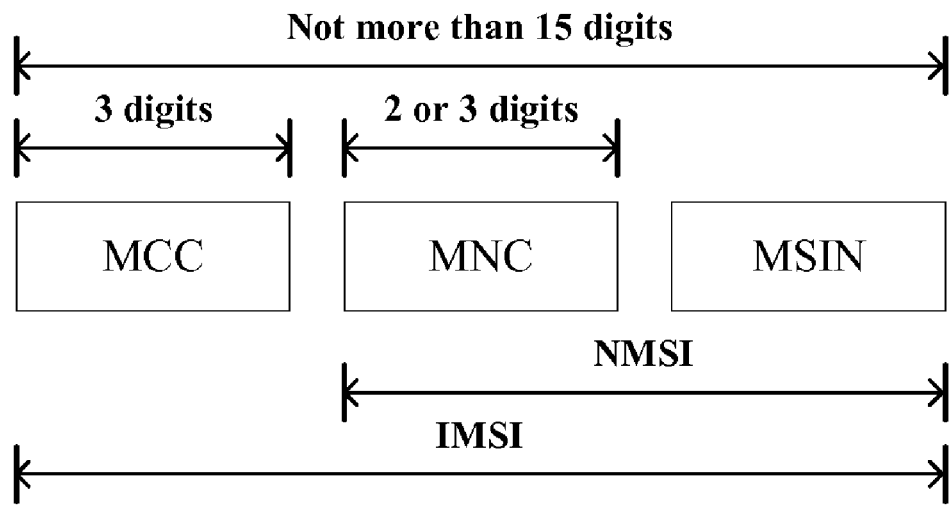
FIG. 2 shows the composition of an IMSI.
Figure 3:
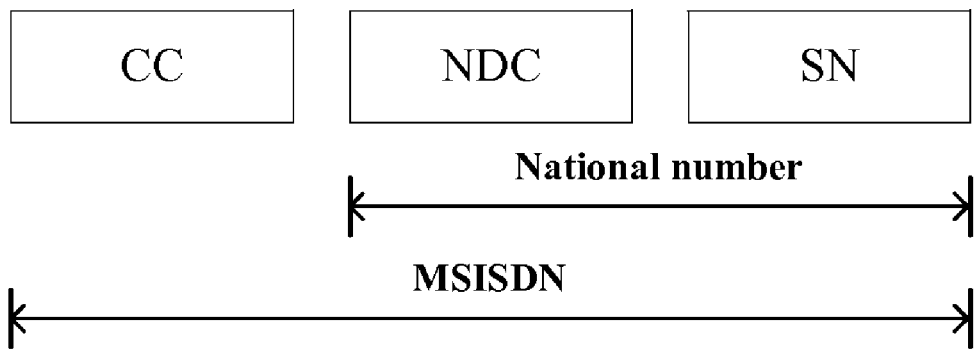
FIG. 3 shows the composition of an MSISDN.
Figure 4:
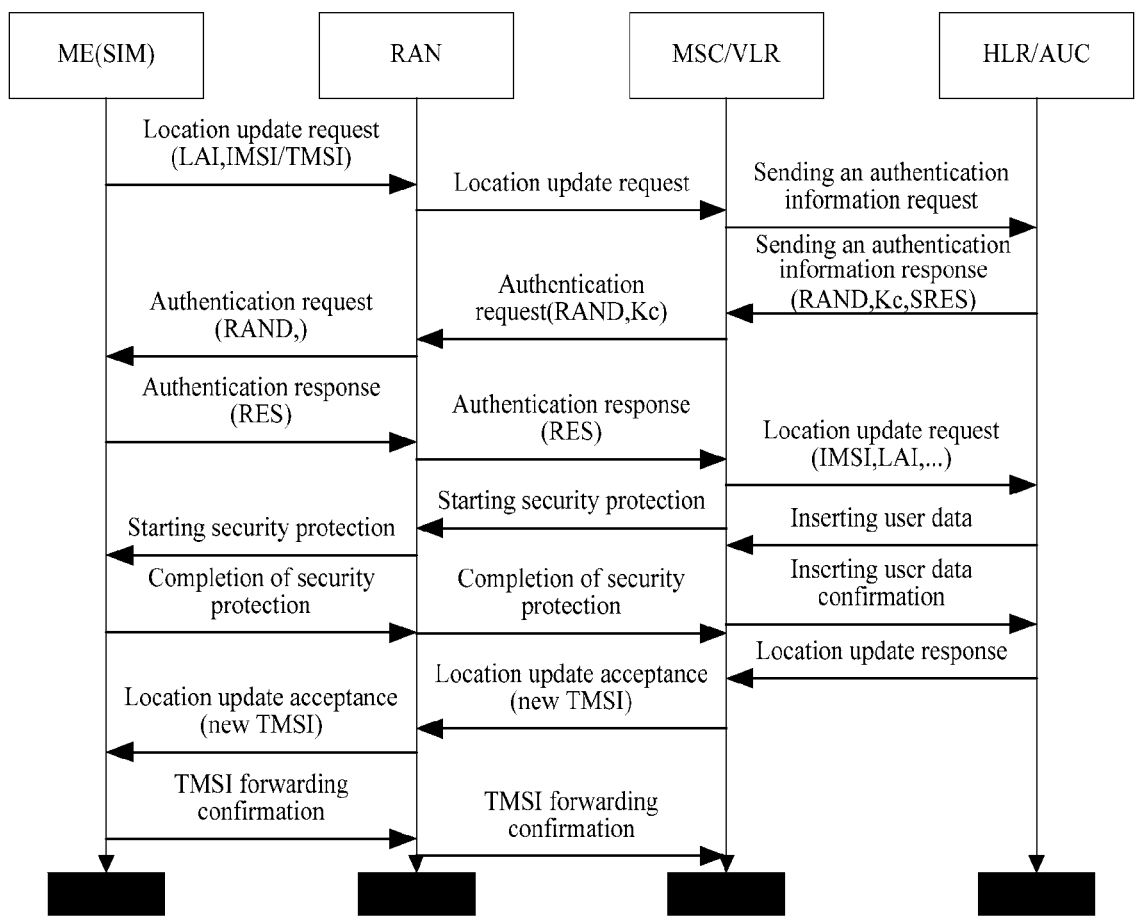
FIG. 4 is a flowchart of registering a SIM card user to a CS domain.
Figure 5:
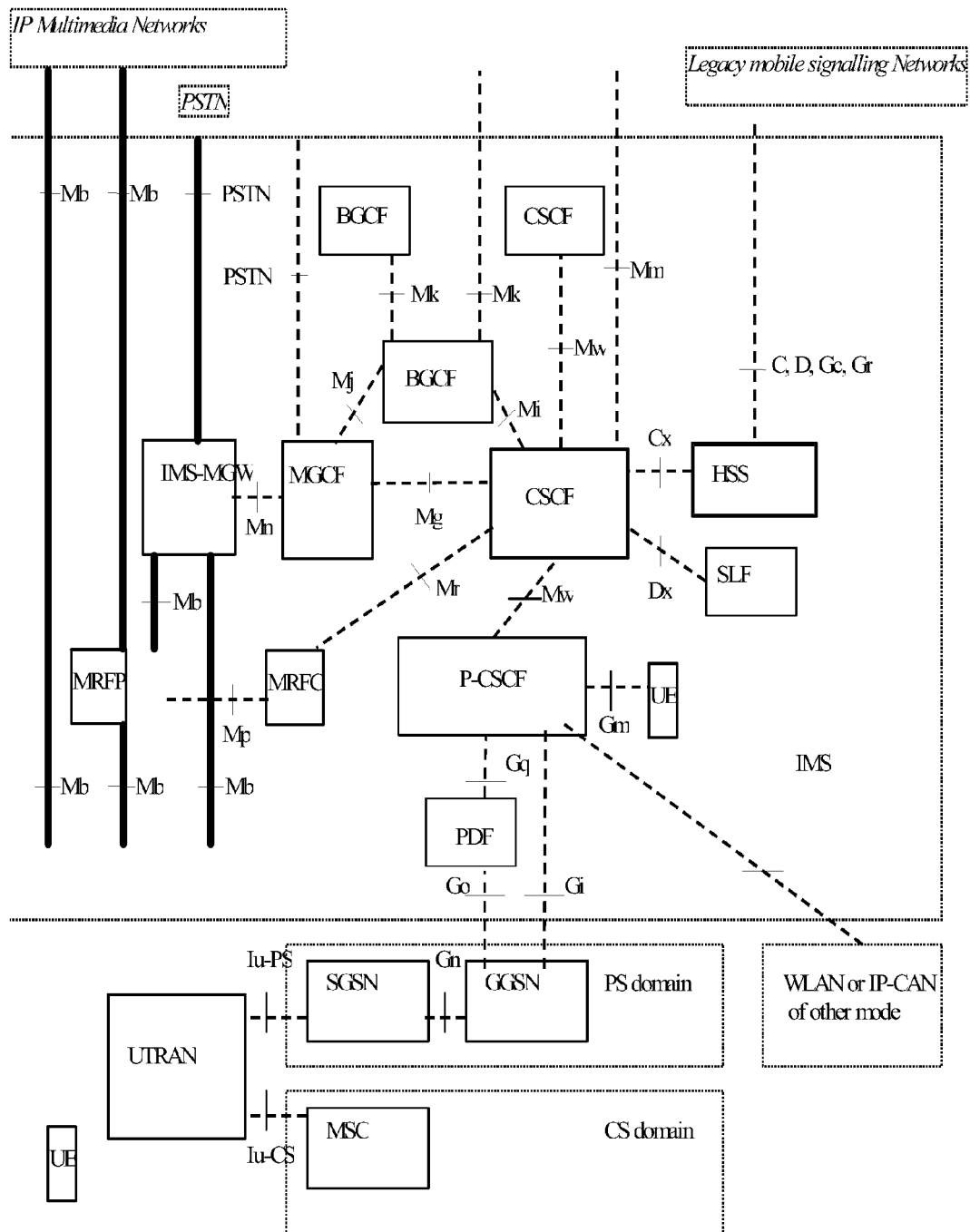
FIG. 5 shows the structure of an IMS system.
Figure 6:
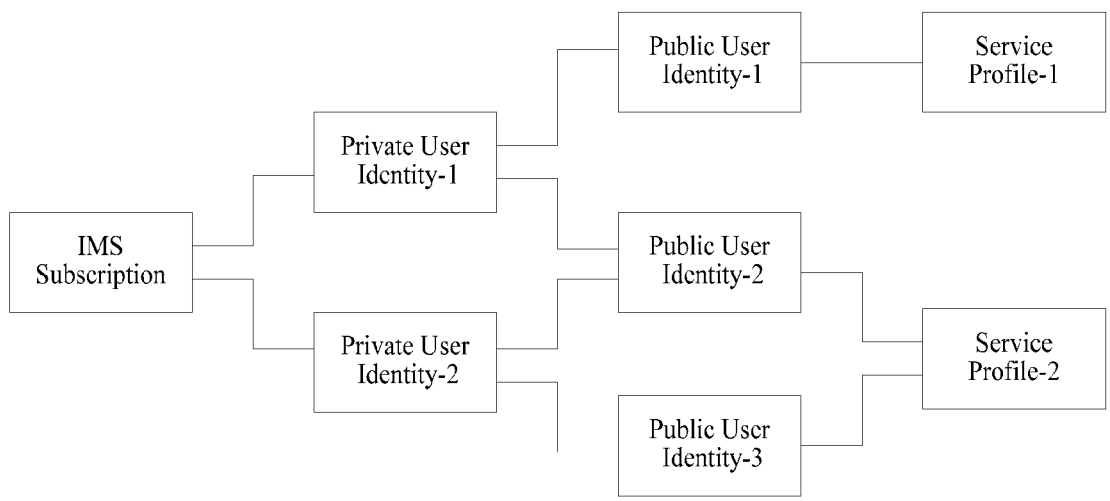
FIG. 6 shows the relationship between the user identity and the service data of an IMS user.
Figure 7:
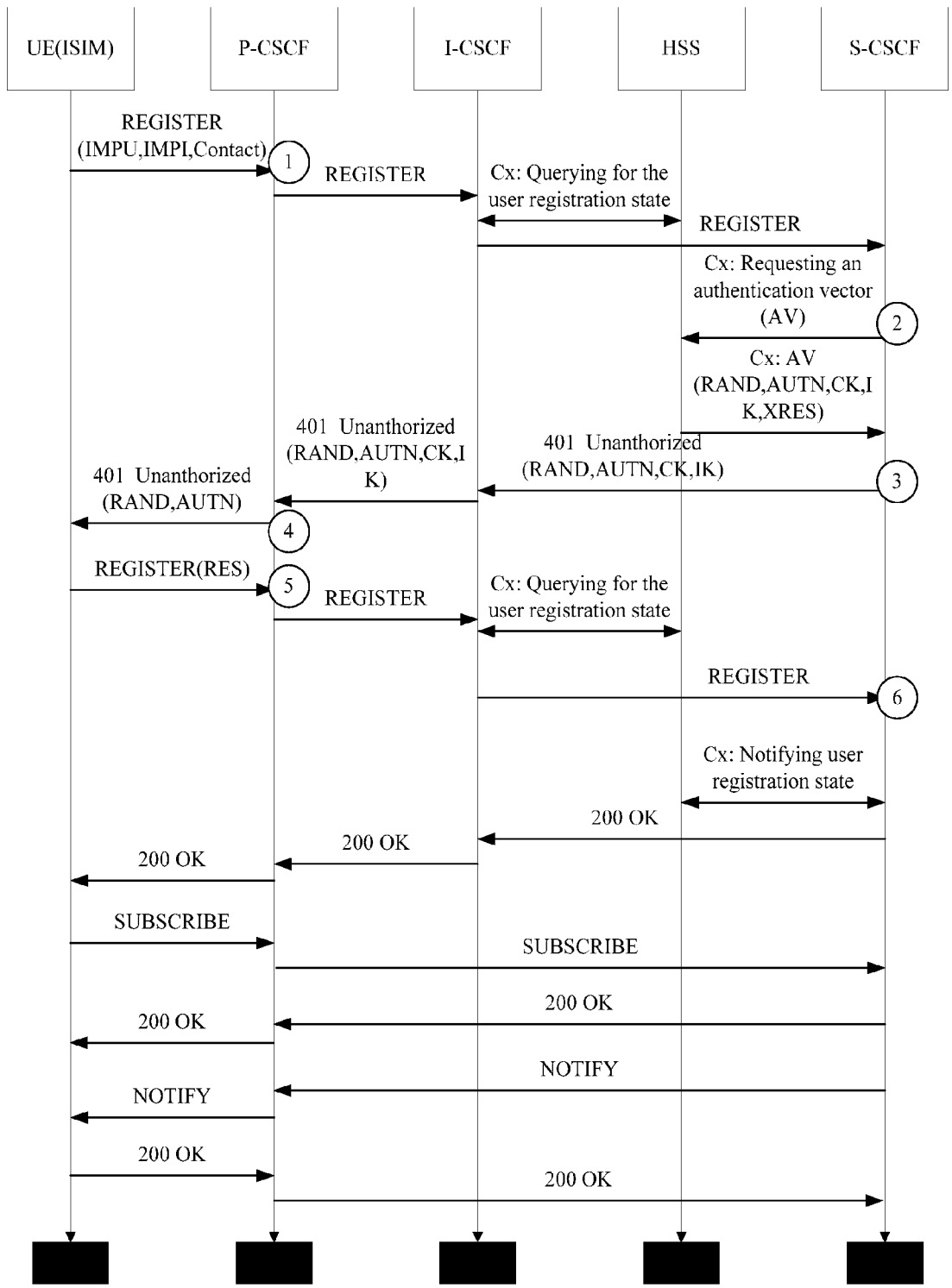
FIG. 7 is a flowchart of initial registration of an IMS user.
Figure 8:
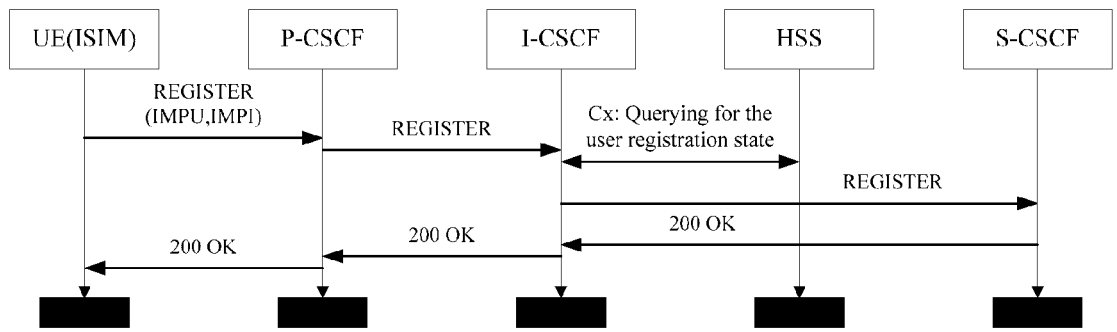
FIG. 8 is a flowchart of re-registration of an IMS user.
Figure 9:
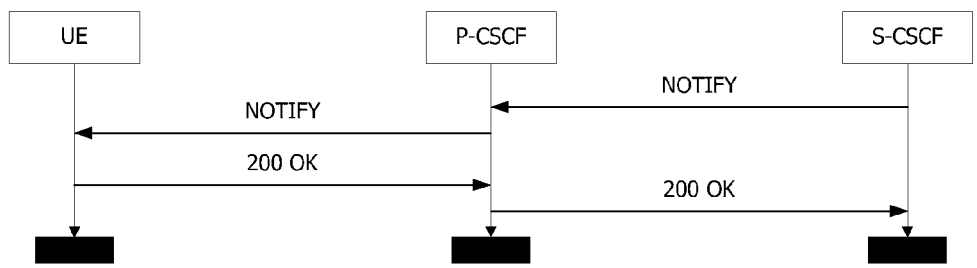
FIG. 9 is a flowchart of re-registration initiated by an IMS network.
Figure 10:
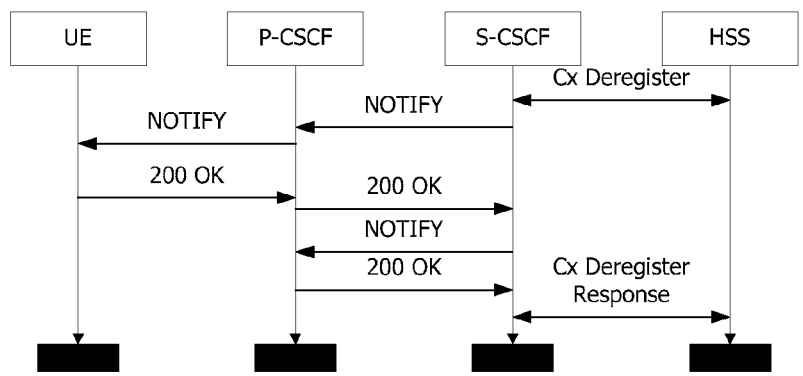
FIG. 10 is a flowchart of deregistration initiated by an IMS network.
Figure 11:
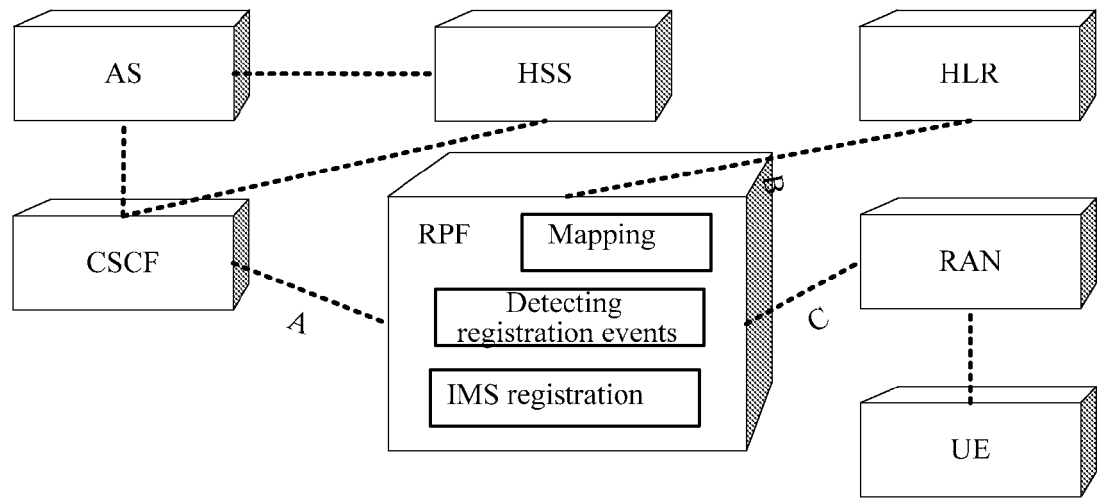
FIG. 11 shows the structure of a system and apparatus according to an embodiment of the invention.

First, the embodiments of the present invention provide a system for registering a mobile CS user who needs to access an IMS network. As shown in FIG. 11, a Register Proxy Function (RPF) entity is added between the CS network and the IMS network. Through the RPF entity, the system registers to the IMS network on behalf of the mobile CS user so that the mobile CS user can access the IMS network. In this way, the IMS network is compatible with a CS terminal and an IMS-emulated CS terminal. Both "CS terminal" and "CS user" mentioned above refer to a mobile CS user. To make the description clearer, the mobile CS user is referred to as "UE" hereinafter.

The functions of the entities in the system provided in an embodiment of the present invention are described below with reference to FIG. 11:

(i) RPF

An RPF is added in the embodiments of the present invention, and is adapted to register to an IMS network on behalf of a mobile CS user on the basis of inheriting the registration-related functions of an MSC and a VLR in the CS domain.

To implement the embodiments of the present invention, an RPF includes a first interface for communicating with the IMS network and a second interface for communicating with the CS network. The basic processing units of an RPF include:

(1) a registration event detecting unit, adapted to detect the CS registration event initiated by a mobile CS user through the second interface, namely, registration event of CS signaling initiated by a CS user, and trigger the mapping unit, in which a registration event may be an event of registration or deregistration;

(2) a mapping unit, adapted to map the CS registration event to an IMS registration event;

the mapping unit further includes an identity mapping unit, adapted to map the CS domain ID of a mobile CS user to an IMS domain ID according to a predetermined mapping mode;

(3) an IMS registering unit, adapted to register to the IMS network on behalf of a CS user through the first interface according to the IMS registration event mapped by the mapping unit. That is, the IMS registering unit is adapted to register to the IMS domain on behalf of a mobile CS user. In the registration process, the mapping unit needs to export the user identity of the user in the mobile CS domain to the user identity and home network ID required for registering to the IMS domain;

In addition to the foregoing basic processing units, at least one of these additional processing units must exist in an RPF: an IMS authenticating unit, a user registration event subscribing unit, a re-registration initiating unit, a user deregistering unit, and a user handover event subscribing unit.

The foregoing additional processing units are adapted to implement the following functions:

performing authentication in the IMS domain on behalf of a mobile CS user;

subscribing to user registration events; notifying a mobile CS user to initiate re-registration;

re-registering to an IMS network on behalf of a mobile CS user;

deregistering from the IMS network on behalf of a mobile CS user;

notifying a mobile CS user network to initiate deregistration; and enabling other IMS network entities to subscribe to handover events of a registered mobile CS user.

Additionally, an RPF may further include a CS registering unit, adapted to register a CS user to a CS domain through a third interface between the RPF and the CS subscription database (for example, an HLR, or an HSS that stores CS domain information). Alternatively, the RPF in an embodiment of the present invention may be set on an entity (for example, MSC/VLR) that is located in the CS domain and adapted to implement the registration function (when an RPF is set on an MSC/VLR, the functions of the MSC/VLR may be reduced or increased). The functions of the RPF are implemented through the interface provided for communicating with the IMS network.

(ii) Home Subscriber Server (HSS)

The HSS is a home IMS subscriber server that already exists in the IMS network. It is adapted to manage user data and generate authentication data for CS users. A CS user can be authenticated in the IMS domain directly if the HSS contains the authentication data of the CS user.

(iii) HLR

The HLR is a home CS subscriber server in an IMS network. As an existing entity in the CS network, the HLR is adapted to store subscription data of CS users. The subscription data can be used to authenticate CS users.

The functions of the HLR are optional functions of the system provided by an embodiment of the present invention. The HLR is required in an embodiment of the present invention only in a specific registration mode, namely, only when the authentication for the UE is impracticable in the IMS domain and must be performed in the CS domain. Through the HLR, the CS user authentication is implemented.

In a specific application process, the HLR and the HSS shown in the figure may be combined into an HSS, or work independently.

(iv) Call Session Control Function (CSCF)

The CSCF is an entity of the IMS network. Especially, the Serving-CSCF (S-CSCF) identifies a user as a CS user who accesses the IMS network, and works with the HSS to authenticate the mobile CS user in the IMS network. Nevertheless, if no authentication is required for the user in the IMS domain, such processing is unnecessary.

In the system under the present invention, a Radio Access Network (RAN) may be, but is not limited to: a UTRAN or GERAN defined by the 3GPP, or a RAN defined by the 3GPP2.

In FIG. 11, depending on the location of the RPF, if the RPF and the P-CSCF work in the same entity, interface A is an Mw interface defined by the IMS; otherwise, interface A is a Gm interface defined by the IMS. Interface B is an interface connected to the HSS of the user when the RPF implements registration of a mobile CS user through CS signaling. In the application, interface B may be, but is not limited to: an interface defined by the 3GPP, or a MAP interface defined by the 3GPP2. Interface B is optional in the embodiments of the present invention. Interface C is an interface between the RPF and the RAN. In the application, interface C may be, but is not limited to: Iu interface or A-interface defined by the 3GPP, or A-interface defined by the 3GPP2.

The method for enabling a mobile CS user to access an IMS network provided in an embodiment of the present invention is described below.

In the method under the present invention, first of all, an RPF entity needs to detect registration-related events, namely, detect the registration events initiated by non-IMS network users; afterward, the RPF entity initiates registration to the IMS network on behalf of the mobile CS user.

As shown in FIG. 11, when the RPF initiates registration to the IMS network on behalf of a mobile CS user, the registration process can be implemented in the following two modes, depending on the registration time and the authentication mode:

Mode 1: Registering the user at the HLR through interface B, and, if successful, registering the user at the HSS through interface A.

The detailed registration process in the first mode is as follows:

(1) The RPF registers to the CS domain at the HLR on behalf of the user through interface B. The specific registration process is implemented by the basic function entity in the RPF. Because the user is a CS user, the registration process is the same as that in the prior art.

(2) The RPF registers the user to the IMS through interface A after registering the user to the CS domain successfully.

Step (2) further includes:

(2-1) The RPF maps and converts a CS registration event or parameter to an IMS registration event or parameter. The process of mapping and conversion includes:

(2-1-1) The RPF maps a CS domain ID of the user to an IMS domain ID.

That is, the RPF needs to convert the CS domain ID of the user into an IMS domain ID when registering to the IMS network on behalf of the CS user, including the processes of converting one or more of the following IDs into the corresponding IMS domain ID:

(2-1-1-1) A home domain name is generated.

Specifically, five or six digits in the IMSI can be used, depending on the length of the MNC. The ID of the 3GPP is added to the MNC and the MCC to generate a home domain name. Generally, the format of a generated home domain name is: ims. mnc<actual MNC>.mcc<MCC>. 3gppnetwork.org; for example, if an IMSI is 234150755999999, MCC=234, and MNC=15, then the generated home domain name is: ims.mnc15.mcc234.3 gppnetwork.org.

Further, a sub-domain number (SDN, consisting of several digits following the MNC in the IMSI) can be added on the basis of the foregoing 3GPP method. The ID of the 3GPP is added to generate a home domain name. Generally, the format of a generated home domain name is: ims. mnc<actual MNC>.mcc<MCC>.sdn<SDN>3gppnetwork.org; for example, if an IMSI is 234150755999999, MCC=234, MNC=15, and the SDN of the operator in a certain area is 0755, then the generated home domain name is: ims.mnc15.mcc234.sdn0755.3 ppnetwork.org.

(2-1-1-2) Temporary IMPU and IMPI are generated.

Likewise, the temporary IMPU and IMPI can be generated according to the IMSI of the user; the format of a temporary IMPU is "SIP: user identity @ home domain name", and the format of an IMPI is "user identity @ home domain name", in which the user identity is generated according to the IMSI of the CS user directly, and the home domain name is generated in the foregoing method. For example, if an IMSI is 234150755999999, the temporary IMPU and IMPI may be:

SIP: 234150755999999@ims.mnc15.mcc234.sdn0755. 3gppnetwork.org and 234150755999999@ims.mnc15.mcc234.sdn0755. 3gppnetwork.org.

(2-1-1-3) After the CS user is registered to the IMS network, the returned default IMPU is generated in the format of "E.164 number @ home domain name", and stored in the HSS, S-CSCF, RPF, or AS, so as to serve as a default IMPU of the user in the IMS network.

Supposing that an IMPU is "8613907551234@sz.gd.cm-cc.com", the user uses this IMPU throughout the IMS network, and the E.164 number of the user can be exported according to the IMPU of the user. In the home IMS network of the user, the IMPU of the user can also be exported according to the E.164 number of the user, or the IMPU of the user can be found through the ENUM service according to the E.164 number of the user.

(2-1-2) The RPF maps the detected CS registration event to an IMS registration event, and initiates registration to the IMS network.

Specifically, the RPF maps the detected CS registration event. The specific mapping process is as follows:

"UE power-on" is mapped to "IMS initial registration";

"Initial location update after roaming to a new location area" is mapped to "IMS initial registration"; and "Periodic location update" is mapped to "IMS re-registration".

(22) The IMS network authenticates the CS user. The authentication process includes:

When handling a Register request, if the S-CSCF identifies that the registration requester is a CS user, the S-CSCF decides to implement the registration directly without initiating an authentication process for the user.

The specific process of identifying a CS user registered in an IMS network is as follows:

A CS user is identified according to the user identity in the request; the S-CSCF and the HSS may resolve the user identity according to the network configuration, and then judge whether the CS user is registered according to the resolved user identity. The user identity may be, but is not limited to: a temporary IMPU or IMPI used in the registration.

The identification process may also be performed according to the specific parameter value or a combination of different parameter values in the Register request. The detailed information carried in the parameter or combination of parameters is decided by the handling Network Element (NE). For example, in an S-CSCF, the identification process is performed according to the parameter in the received Register request, including but not limited to the parameter of the Authorization header field such as "auth-scheme"; in the HSS, the identification process is performed according to the parameter in the received authentication request, including but not limited to the "auth-scheme" parameter which indicates the authentication scheme supported by a terminal, and more broadly, the parameter that indicates attributes of the access network.

(23) The CS user is registered in the IMS domain. In the HSS and each CSCF, the user registration information needs to be updated, and optionally, the user registration event is subscribed to. The update of user registration information includes: marking the CS user as registered, and so on.

The registration process further includes:

When the HSS receives a user data request of the S-CSCF in the registration process, the HSS identifies the CS user according to the user identity in the request, and verifies the previous authentication result of the user in the HLR. If the authentication in the HLR succeeds, the HSS continues with the IMS registration; otherwise, the HSS rejects the registration in the IMS domain.

Alternatively, the HSS can register the user to the IMS domain directly without authenticating the user at the HLR.

Mode 2: The RPF registers the user at the HSS in the IMS only through interface A.

The detailed registration process in the second mode is as follows: (1) The RPF maps and converts a CS registration event or parameter to an IMS registration event or parameter. The process of mapping and conversion includes:

The RPF maps the CS domain ID of the user to an IMS domain ID. For the detailed process, see the counterpart of the first mode.

The RPF maps the detected CS registration event to an IMS registration event. For the detailed process, see the counterpart of the first mode.

The RPF maps the authentication capability supported by the detected CS terminal to the parameter in the SIP Register message, and initiates registration to the IMS network. The mapping of the authentication capability of the terminal may be performed in one of these modes: GSM mode, UMTS mode, and CDMA mode. Specifically, the parameter in the Authorization header field in the SIP Register message can be extended to carry the authentication capability information, for example, extended parameter "auth-scheme". In this way, the foregoing terminal authentication capability is mapped to "GSM-AKA", "UMTS-AKA" and "CDMA-AKA" respectively.

(2) The IMS network authenticates the CS user. The authentication process includes:

First, the S-CSCF receives an initial Register request. After determining that the request is a Register request of the CS user, the S-CSCF requests the HSS for authentication information according to the parameters in the request, and specifies the authentication scheme supported by the user and other authentication-related information. The detailed process of identifying a Register request of the CS user is described above, and is not repeated further.

Here the detailed process of determining the authentication scheme and other authentication-related information is: The S-CSCF determines the authentication scheme of the request sent to the HSS according to the extended parameter of the Authorization header field, for example, "auth-scheme", and exports the type of the access network according to the "P-Access-Network-Info" header field. In this way, the two parameters that need to be included in the authentication request message sent to the HSS are obtained.

Afterward, after receiving the authentication request sent from the S-CSCF, the HSS generates proper authentication vectors (AVs) according to the information in the request message. After processing such AVs, the HSS returns the AVs to the S-CSCF, which will authenticate the user.

Specifically, the HSS determines the AV type in use according to the user attributes, and judges whether to perform conversion between a quintuplet vector and a triplet vector according to the received access network type, the authentication scheme supported by the UE, and the user attribute information; afterward, the HSS returns the final AV to the S-CSCF, and specifies the authentication scheme implemented in the network.

(3) The CS user is registered to the IMS domain, and the user is notified of registration completion.

The detailed process is described below:

First, the relevant NEs in the IMS domain update the registration state of the user, namely, update the CS user as a registered user; and optionally, perform subsequent processing such as subscription to user registration events.

Afterward, the RPF maps the network 200 OK, which is received when the RPF registers to the IMS domain on behalf of the user, to a "location update acceptance" message of the CS domain, indicating that the registration is completed.

Other possible processes subsequent to registration of the CS user to the IMS domain include: re-registration, subscription, and deregistration. The mapping processes of re-registration, deregistration and subscription are mutually independent.

Possible processes subsequent to registration are described below.

(1) The RPF initiates subscription to user registration events on behalf of the mobile CS user.

After detecting completion of registration to the IMS domain, the RPF initiates subscription to user registration events on behalf of the user. If the RPF is located at the P-CSCF, the RPF also needs to initiate the same subscription on behalf of the P-CSCF.

(2) The RPF deregisters from the IMS network on behalf of the mobile CS user.

If the RPF detects a power-off event of the mobile CS user or a Cancel Location message, the RPF initiates deregistration on behalf of the user.

(3) The RPF handles the user deregistration initiated by the IMS network.

After receiving the user deregistration message from the network, the RPF uses CS related signaling or application to notify the user that the user is deregistered from the IMS domain.

Figure 12:
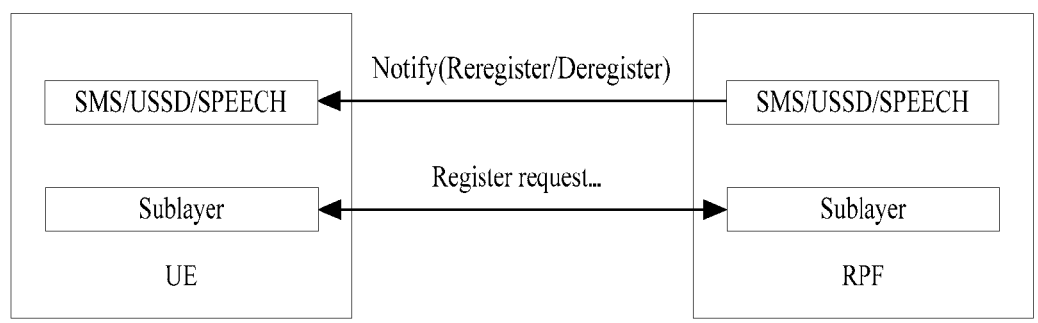
FIG. 12 shows the process of an application-layer registration notification.

As shown in FIG. 12, for WCDMA and GSM networks, if the radio interface has no proper signaling process when the network initiates deregistration, the practices in the application layer may be applied, for example, using a short message, Unstructured Supplementary Service Data (USSD) or network announcement to notify the user that the user is deregistered from the IMS domain, so that the user knows the state in time.

(4) The RPF handles the user re-registration initiated by the IMS network.

In the first mode described above, the RPF can initiate re-registration to the IMS network on behalf of the user after receiving a request for re-registering the user from the network.

In the second mode described above, the RPF uses CS related signaling or application to notify the user to initiate a registration process after receiving a request for re-registering the user from the network.

As shown in FIG. 12, for WCDMA and GSM networks, when the network initiates re-registration, if the radio interface has no proper signaling process, the practice in the application layer may apply, for example, using an short message, USSD or network announcement in the prior art to notify the user and implement the re-registration process; if the user is notified through a short message or USSD and the UE is capable of handling the process, the UE initiates re-registration automatically after notifying the user; if the user is incapable of handling, a re-registration notification needs to be displayed to the user, and the user will decide whether to initiate registration again; if the user is notified through a network announcement, it is up to the user to decide whether to initiate registration again.

(5) The RPF handles the subscription to user handover events initiated by other IMS network entities, and the corresponding event notification.

After the RPF finishes registration to the IMS domain on behalf of a CS user, the RPF requests the network entities interested in the user handover event to subscribe to the handover event to the RPF. That is, an entity in the IMS network may subscribe to the user handover event perceivable at the RPF, including handover inside the RPF and handover between RPFs.

After handling the request, the RPF notifies the detected user handover event to the entities that have subscribed to handover events. That is, after detecting completion of handover, the RPF notifies the corresponding event to the subscriber.

(6) The RPF entity re-registers to the IMS network on behalf of the CS user.

After receiving a Re-Register request from the user, the RPF can initiate re-registration to the IMS network on behalf of the mobile CS user.

To make the technical solution under the present invention clearer, the present invention is hereinafter described in detail with reference to embodiments and accompanying drawings.

Embodiment 1

In the first embodiment, the initial registration process performed in mode 1 before a mobile CS user can access an IMS network is described below. Although the WCDMA technology is used as an example here, the application of the present invention is not limited to the WCDMA technology. The RPF is combined with the P-CSCF in the embodiment, but this is not intended to limit the actual application of the present invention.

Figure 13:
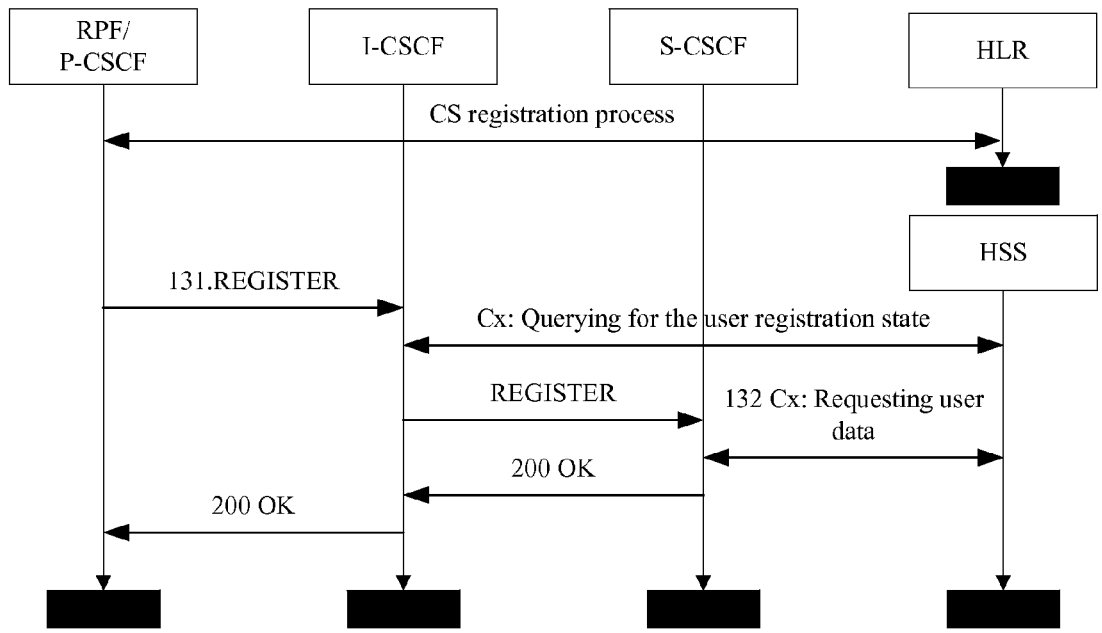
FIG. 13 is the first flowchart of the method according to an embodiment of the present invention in the first mode.

As shown in FIG. 13, the first embodiment includes the following steps:

Step 131: After completing the registration from the CS domain to the HLR on behalf of the user, the RPF maps the CS domain ID to the IMS domain ID, constructs a Register message of the IMS network and sends it to the IMS network.

The detailed conversion from a CS domain ID to an IMS domain ID is described above, and not repeated further.

Step 132: When handling the Register request, if the S-CSCF identifies that the registration requester is a CS user, the S-CSCF decides to notify the HSS of user registration success directly without initiating an authentication process for the user because the CS user has passed the authentication and registration at the HLR.

In Step 132, the detailed process of the S-CSCF identifying whether the user is a CS user is described above, and not repeated further.

Step 133: The HSS and the CSCFs update the user registration information. By now, the CS user has been registered to the IMS domain successfully.

In Step 133, the update of user registration information includes: marking the CS user as registered.

Embodiment 2

Figure 14:
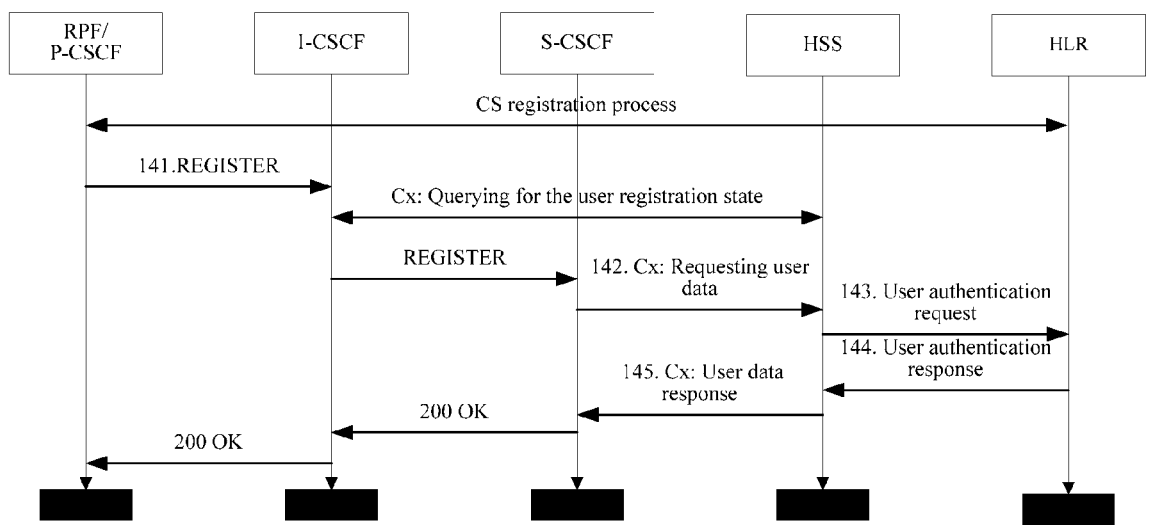
FIG. 14 is the second flowchart of the method according to an embodiment of the present invention in the first mode.

In the first mode, the initial registration process before a mobile CS user can access an IMS network is shown in FIG. 14. Although the WCDMA system is used as an example in this embodiment, the application of the present invention is not limited to the WCDMA system. FIG. 14 supposes that the RPF is combined with the P-CSCF, but this is not intended to limit the actual application of the present invention.

In FIG. 14, in the initial registration process in the first mode, the process for an HSS to verify the HLR authentication result includes:

Step 141: After completing the registration from the CS domain to the HLR on behalf of the user, the RPF maps the CS domain ID of the CS user to the IMS domain ID, constructs a Register message of the IMS network and sends it to the IMS network.

Step 142: When handling the Register request, if the S-CSCF identifies that the registration requester is a CS user, the S-CSCF decides to notify the HSS of user registration success directly without initiating an authentication process for the user, and request the user data.

Step 143: The HSS queries the HLR for the authentication result of the user through an interface with the HLR.

Step 144: The HLR queries for the user state according to the user identity provided by the HSS, and returns the query result to the HSS.

Step 145: The HSS and the CSCFs update the user registration information. By now, the CS user has been registered to the IMS domain successfully.

Embodiment 3

Figure 15:
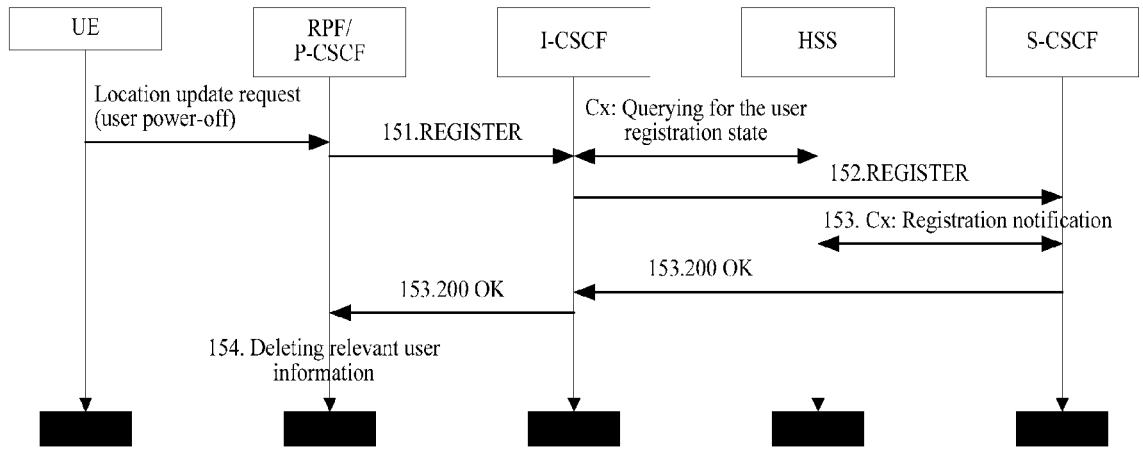
FIG. 15 is the third flowchart of the method according to an embodiment of the present invention in the first mode.

In the first mode, when a mobile CS user powers off the UE, the RPF maps the "user power-off" event to "IMS de-registration initiated by the user". The de-registration process is shown in FIG. 15, supposing the RPF is combined with the P-CSCF;

In FIG. 15, in the first mode, the deregistration process initiated by the user includes:

Step 151: When detecting a power-off event of a CS user, the RPF can initiate deregistration to the IMS network on behalf of the user after setting the state of the CS domain. The parameters are the same as those in the initial registration except that the "expires" field after the "Contact" field is set to 0, which means that the user needs to be deregistered. According to the home domain name of the user, the RPF resolves the address of the home I-CSCF. Afterward, the RPF sends a SIP Register message.

Step 152: According to the IMPU and IMPI of the user, the I-CSCF queries the HSS for the registration state of the user. If the user is legal and registered, the HSS returns the S-CSCF address information, and the I-CSCF forwards the Register request to the selected or returned S-CSCF address.

Step 153: Because the value of the "expires" field of the request is 0, the S-CSCF knows that the user needs to be deregistered. Therefore, the S-CSCF notifies the HSS to update the user registration state and returns a 200 OK message to the RPF.

Step 154: After receiving the 200 OK message, the RPF clears the user-related information stored in the RPF, thus completing the deregistration process in the case of user power-off.

Embodiment 4

Figure 16:
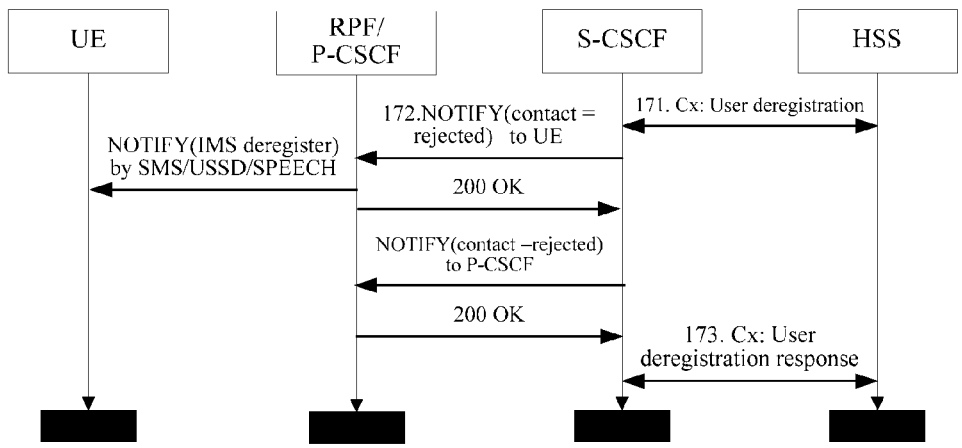
FIG. 16 is the fourth flowchart of the method according to an embodiment of the present invention in the first mode.

In the first mode, when a mobile CS user accesses an IMS network, the IMS network initiates a deregistration process. The deregistration process is shown in FIG. 16, in which the HSS decides to deregister the user, supposing the RPF is combined with the P-CSCF. It should be noted that the deregistration process is also applicable to the second mode.

As shown in FIG. 16, the deregistration process includes the following steps:

Step 171: The HSS notifies the S-CSCF to deregister the user.

Step 172: The S-CSCF sends a NOTIFY message to the user and the P-CSCF according to the registration and subscription information of the user and the P-CSCF, indicating that the user is deregistered; and sets the event attribute of the "Contact" field of the message to "rejected"; after receiving the message, the RPF notifies the UE that the UE is deregistered from the IMS through the application layer. In this case, the UE will no longer be able to initiate an IMS service.

Step 173: After receiving all the returned 200 OK messages, the S-CSCF notifies the HSS of deregistration completion.

Embodiment 5

Figure 17:
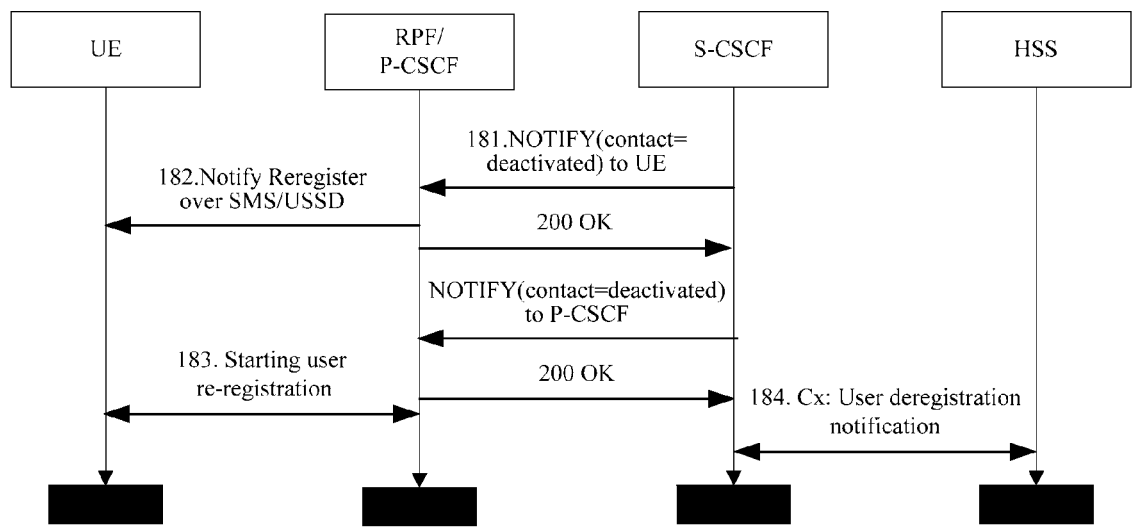
FIG. 17 is the fifth flowchart of the method according to an embodiment of the present invention in the first mode.

In the first mode, the re-registration process initiated by the network when a mobile CS user accesses an IMS network is shown in FIG. 17, in which the S-CSCF notifies the user to initiate re-registration after registration timeout, supposing the RPF is combined with the P-CSCF. It should be noted that the re-registration process is also applicable to the second mode.

In FIG. 17, in the first mode and the second mode, the re-registration process initiated by the network includes the following steps:

Step 181: After detecting expiry of the lifetime of user registration, the S-CSCF notifies the user to re-register.

According to the registration and subscription information of the user and the P-CSCF, the S-CSCF sends a NOTIFY message to the user and the P-CSCF, notifying the user to initiate re-registration, and sets the event attribute of the "Contact" field of the message to "deactivated";

Step 182: After receiving the re-registration notification from the S-CSCF, the RPF notifies the UE to initiate re-registration through the application layer.

Step 183: The UE initiates re-registration.

Step 184: After receiving all 200 OK messages returned by the RPF on behalf of the user and returned by the P-CSCF, the S-CSCF notifies the HSS of the user state.

Embodiment 6

Figure 18:
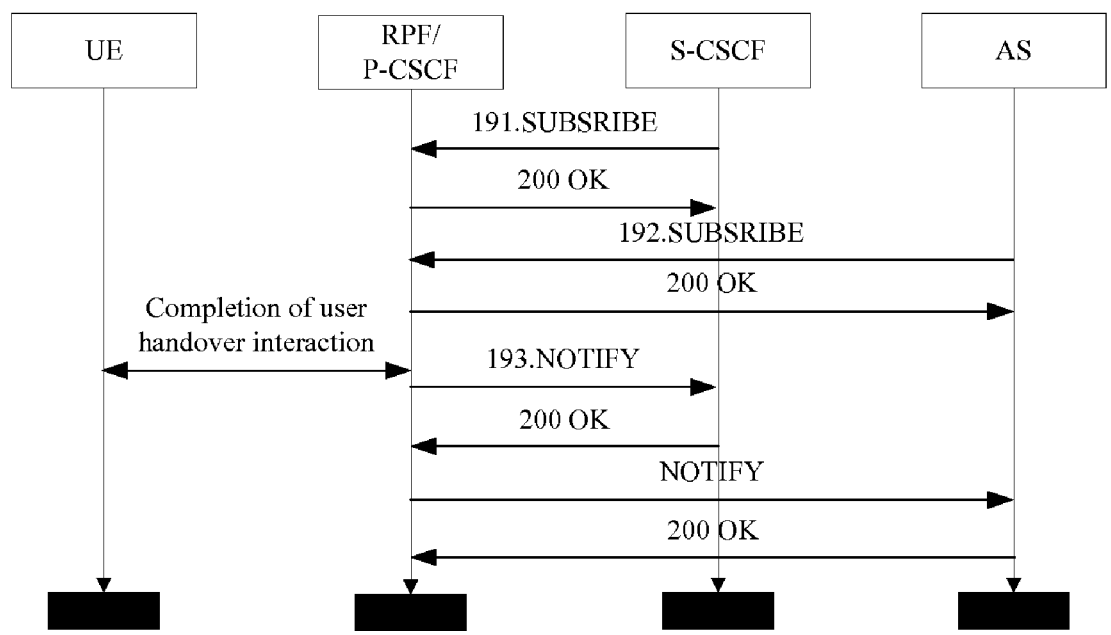
FIG. 18 is the sixth flowchart of the method according to an embodiment of the present invention in the first mode.

In the first mode, the process for a network to subscribe to user handover events when a mobile CS user accesses an IMS network is shown in FIG. 18, supposing the RPF is combined with the P-CSCF. It should be noted that this process is also applicable to the second mode.

In FIG. 18, in the first mode and the second mode, the process for a network to subscribe to user handover events includes the following steps:

Step 191: After success of user registration, the S-CSCF initiates a process of subscribing to handover events to the user.

Step 192: As required, the Application Server (AS) can initiate the process of subscribing to handover events to the user after the user is registered successfully. The AS perceives the registration through registration of a third party.

Step 193: The UE initiates a handover process. Upon completion of handover, the UE notifies the subscriber that a handover event occurs through a notification message. The message carries the new location area ID or cell ID and other parameters that are interesting to the subscriber. Depending on the type of handover such as intra-office handover, inter-office handover, and subsequent handover, the subscriber can specify one or more types of the handover events to be subscribed to in the subscription process.

The foregoing seven embodiments describe the implementation of the present invention in the first mode. The following embodiments further describe the implementation of the present invention in the second mode.

Embodiment 7

Figure 19:
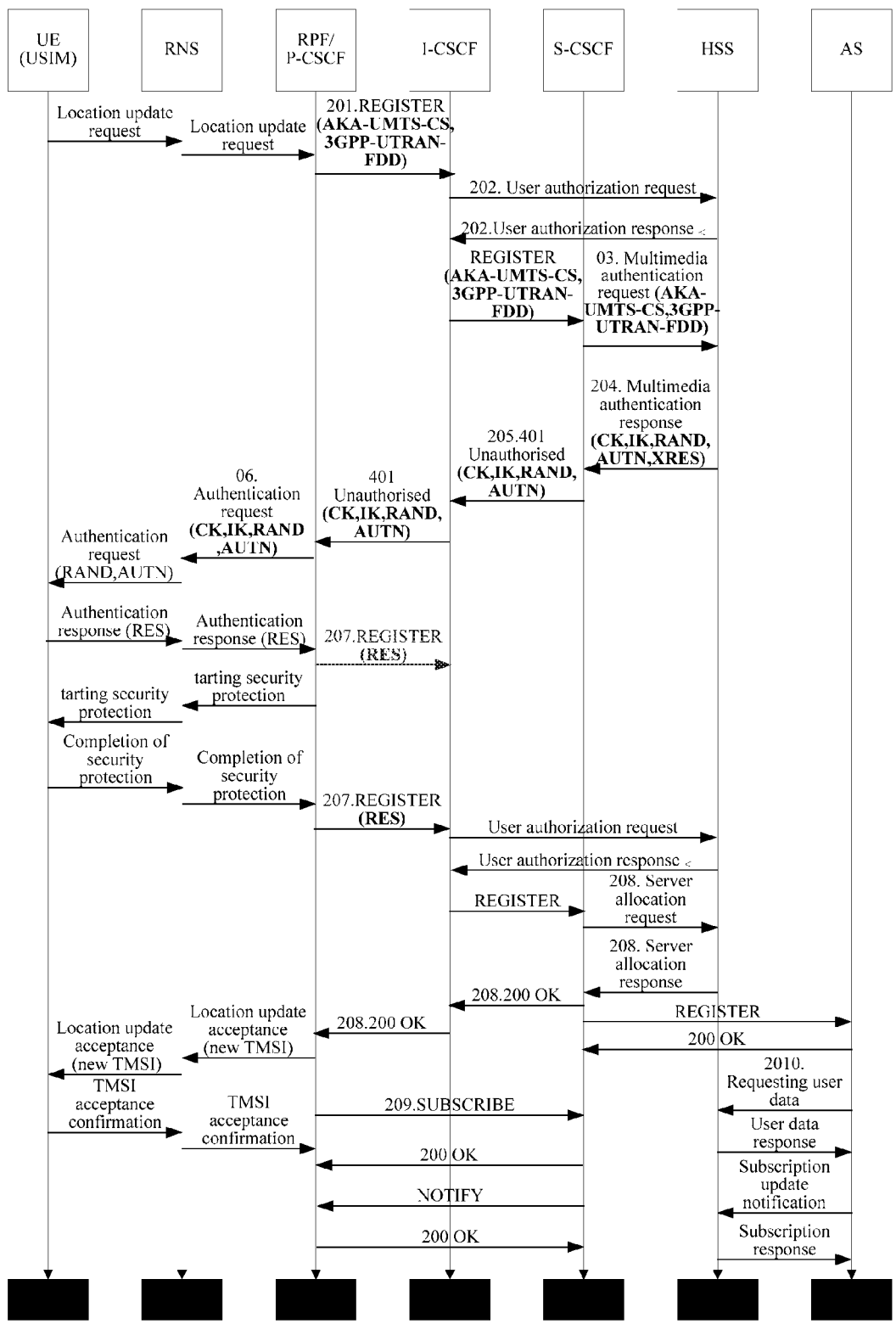
FIG. 19 is the first flowchart of the method according to an embodiment of the present invention in the second mode.

In the second mode, the initial registration process performed before a mobile CS user can access an IMS network is shown in FIG. 19. Although the Radio Network Subsystem (RNS) of the WCDMA system is used as an example here, the application of the present invention is not limited to the WCDMA system.

As shown in FIG. 19, the detailed initial registration process includes the following steps:

Step 201: The RPF sends a Register message to the I-CSCF.

The details of this step are:

First, after detecting the "location update request" sent by the UE, the RPF exports the ID required for IMS registration in various modes described above according to the CS domain ID of the CS user.

Afterward, according to the exported home domain name, the RPF resolves the address of the home I-CSCF, and sends a SIP Register message to the I-CSCF of the IMS network, so as to register the CS user to the IMS network.

The Register message includes an extended parameter of the Authorization header field, for example, "auth-scheme".

The extended parameter is adapted to indicate the authentication scheme that is supported by the UE and derived from the CS signaling received from the Radio Network Subsystem (RNS); moreover, the Register message includes access network information in the "P-Access-Network-Info" header field. Here the access network may be in the Universal Terrestrial Radio Access Network—Frequency Division Duplex (UTRAN-FDD) mode.

Step 202: The I-CSCF forwards the Register request message to the selected or determined S-CSCF.

According to the IMPU and IMPI of the user, the I-CSCF queries the HSS for the registration state of the user. If the HSS determines that the user is legal and unregistered, the HSS returns the S-CSCF capability information. According to the capability information, the I-CSCF selects an S-CSCF for handling the Register request. Afterward, the I-CSCF forwards the Register request message to the selected S-CSCF address. If the HSS determines that the user is legal and registered, the HSS returns the S-CSCF address information. Afterward, the I-CSCF forwards the Register request message to the returned S-CSCF address.

Step 203: After receiving the Register request message, the S-CSCF checks the user identity in the message and determines that the registration requester is a user who accesses the network from the CS domain, and sends a multimedia authentication request message to the HSS. The message indicates the authentication scheme supported by the UE and the type of the access network, so that the HSS can obtain the corresponding authentication data.

Step 204: After receiving the multimedia authentication request, the HSS determines that the user is a CS USIM user according to the user identity. Therefore, the HSS generates a corresponding quintuplet authentication vector (AV) for the user, indicates that the authentication scheme implemented by the network is Authentication and Key Agreement of Universal Mobile Telecommunications System Circuit Switching (AKA-UMTS-CS), and then returns the result to the S-CSCF.

Step 205: After receiving an authentication response that carries result information from the HSS, the S-CSCF removes the "XRES" (expected response) parameter in the authentication vector (AV) and saves the authentication response. Afterward, the S-CSCF initiates an authentication challenge to the user by returning a 401 message to the RPF through the I-CSCF, and sets the "algorithm" parameter in the "WWW-Authenticate" header field to "AKA-UMTS-CS" which is a network authentication scheme indicated by the HSS.

Step 206: After receiving the authentication challenge 401 message, the RPF generates a corresponding CS domain authentication request message and sends it to the UE through the RNS.

Step 207: After receiving the authentication request, the UE calculates out the authentication result according to the received authentication parameter, and returns it to the RPF through the RNS. The RPF sends a second Register request message to the S-CSCF through the I-CSCF.

If the network configuration requires a CS domain security process, the RPF can initiate a second registration to the IMS network after receiving a "security protection completion" message.

If the CS domain requires no security process, the RPF can initiate a second registration to the IMS network after receiving the "authentication response" of the UE from the RNS.

Step 208: After receiving the second Register request forwarded by the I-CSCF, the S-CSCF compares the RES (authentication response) sent from the UE with the XRES (excepted response) stored in the S-CSCF; if they are the same, the authentication succeeds; otherwise, the authentication fails.

After the authentication succeeds, the S-CSCF notifies the HSS of user registration success, downloads user data from the HSS, and then returns a 200 OK message to the RPF; the S-CSCF may initiate a third-party registration to the AS, depending on the inspection performed as against the initial filtering condition (iFC).

Step 209: After receiving the 200 OK message, the RPF updates the stored user state, address information and registration timeout value; and returns a "location update acceptance" message to the UE, with the newly allocated TMSI carried in the message; afterward, the RPF sends a request message to the S-CSCF to subscribe to the registration state notification of the user; after receiving the subscription request, the S-CSCF replies with a NOTIFY message which carries the user registration information, including all registered IMPUs that are not prohibited.

Step 210: After completing the third-party registration at the S-CSCF, the AS retrieves the relevant user data from the HSS, and subscribes to user data change events.

Embodiment 8

Figure 20:
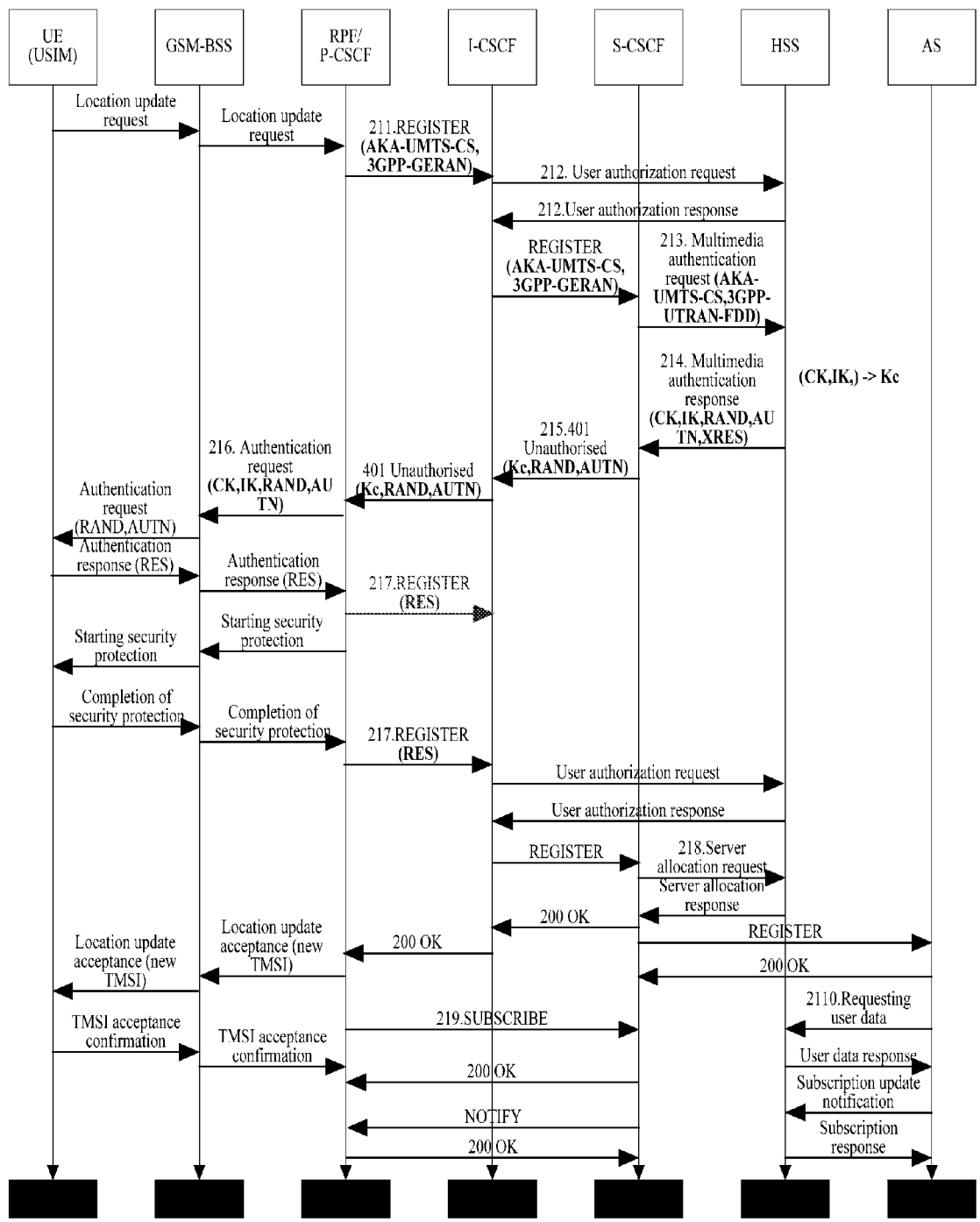
FIG. 20 is the second flowchart of the method according to an embodiment of the present invention in the second mode.

In the second mode, the initial registration process performed before a mobile CS user can access an IMS network is shown in FIG. 20. That is, the process for a USIM card of a 3G terminal to access the network through a GSM Base Station Subsystem (BSS) includes the following steps:

Step 211: After detecting the location update request sent by the UE, the RPF exports the ID required for registration to the IMS domain according to the CS domain ID of the CS user and resolves the home I-CSCF address according to the exported home domain name; afterward, the RPF sends a SIP Register message to the I-CSCF to register to the IMS network; the Register message should carry the extended parameter of the Authorization header field, for example, "auth-scheme", to indicate the authentication scheme that is supported by the UE and obtained by the RPF according to the CS signaling received from the RNC; the Register message also carries the access network information in the "P-Access-Network-Info" header field. In this embodiment, the access network is in a GSM Enhanced Radio Access Network (GE-RAN) mode.

Step 212: According to the IMPU and IMPI of the user, the I-CSCF queries the HSS for the registration state of the user. If the HSS determines that the user is legal and unregistered, the HSS returns the S-CSCF capability information, and the I-CSCF selects an S-CSCF for handling the user Register request. If the user is legal and registered, the HSS returns the S-CSCF address information, and the I-CSCF forwards the Register request message to the selected or returned S-CSCF address.

Step 213: After receiving the request message, the S-CSCF checks the user identity in the message and determines that the registration requester is a user who accesses the network from the CS domain, and indicates the authentication scheme supported by the UE and the type of the access network to the HSS. Therefore, the HSS can obtain the corresponding authentication data.

Step 214: After receiving the request, the HSS determines that the user is a CS USIM user according to the user identity, and generates a corresponding quintuplet authentication vector (AV) for the user. If the HSS determines that the user accesses the network through a GSM BSS according to the access network, the HSS combines the CK and the IK into a Kc, indicates that the authentication scheme implemented by the network is Authentication and Key Agreement of Universal Mobile Telecommunications System Circuit Switching (AKA-UMTS-CS), and then returns the result to the S-CSCF.

Step 215: After receiving an authentication response from the HSS, the S-CSCF removes the XRES parameter in the authentication vector (AV) and saves the authentication response. Afterward, the S-CSCF initiates an authentication challenge to the user by returning a 401 message, and sets the "algorithm" parameter in the "WWW-Authenticate" header field to "AKA-UMTS-CS" which is a network authentication scheme indicated by the HSS.

Step 216: After receiving the authentication challenge 401 message, the RPF generates a corresponding CS domain authentication request message and sends it to the UE through the BSS.

Step 217: According to the received authentication parameter, the UE calculates out the authentication result and returns it to the RPF through the BSS. If the network configuration requires a CS domain security process, the RPF initiates a second registration to the IMS network after receiving a "security protection completion" message. If the CS domain requires no security process, the RPF can initiate a second registration process to the IMS network after receiving a UE authentication response from the BSS;

Step 218: After receiving the second Register request forwarded by the I-CSCF, the S-CSCF compares the RES (authentication response) sent from the UE with the XRES (excepted response) stored in the S-CSCF; if they are the same, the authentication succeeds, and the S-CSCF notifies the HSS of user registration success, downloads user data from the HSS and then returns a 200 OK message to the RPF. Depending on the inspection performed as against the iFC, the S-CSCF may initiate a third-party registration process to the AS.

Step 219: After receiving the 200 OK message, the RPF updates the stored user state, address information and registration timeout value; and returns a "location update acceptance" message to the UE, with the newly allocated TMSI carried in the message; afterward, the RPF sends a request to the S-CSCF to subscribe to the registration state notification of the user; after receiving the subscription request, the S-CSCF replies with a NOTIFY message which carries the user registration information, including all registered IMPUs that are not prohibited.

Step 2110: After completing the third-party registration at the S-CSCF, the AS retrieves the relevant user data from the HSS, and subscribes to user data change events.

Embodiment 9

Figure 21:
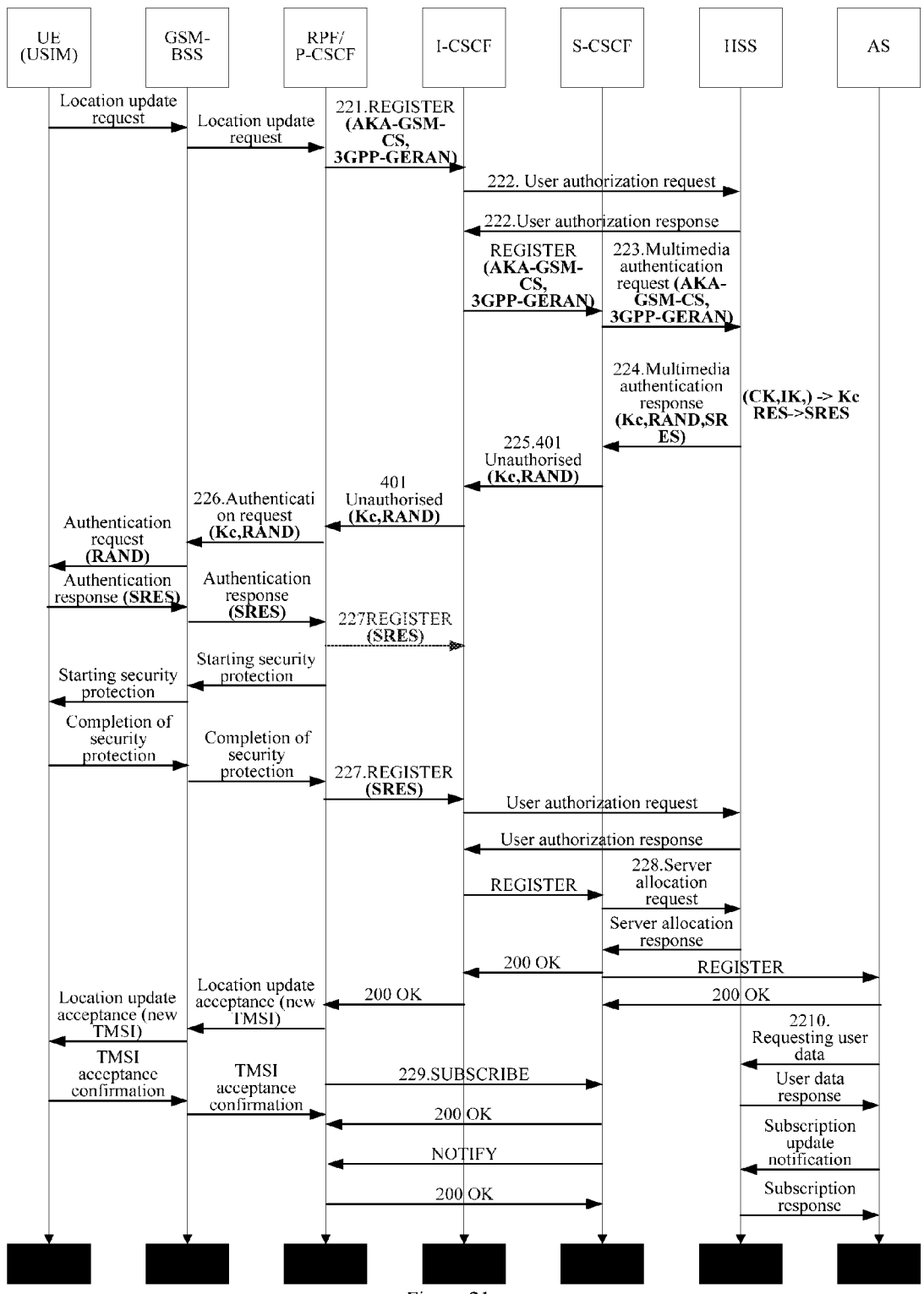
FIG. 21 is the third flowchart of the method according to an embodiment of the present invention in the second mode.

In the second mode, the initial registration process performed before a mobile CS user can access an IMS network is shown in FIG. 21. That is, the process for a USIM card of a 2G terminal to access the network through a GSM BSS includes the following steps:

Step 221: After detecting the location update request sent by the UE, the RPF exports the ID required for registration to the IMS domain according to the CS domain ID of the CS user and resolves the home I-CSCF address according to the exported home domain name; afterward, the RPF sends a SIP Register message to the I-CSCF to register to the IMS network; the Register message should carry the extended parameter of the Authorization header field, for example, "auth-scheme", to indicate the authentication scheme that is supported by the UE and obtained by the RPF according to the CS signaling received from the RNC; the Register message also carries the access network information in the "P-Access-Network-Info" header field. In this embodiment, the access network is in a GERAN mode.

Step 222: According to the IMPU and IMPI of the user, the I-CSCF queries the HSS for the registration state of the user. If the HSS determines that the user is legal and unregistered, the HSS returns the S-CSCF capability information to the I-CSCF, and the I-CSCF selects an S-CSCF for handling the Register request. If the user is legal and registered, the HSS returns the S-CSCF address information, and the I-CSCF forwards the Register request message to the selected or returned S-CSCF address.

Step 223: After receiving the Register request message from the I-CSCF, the S-CSCF checks the user identity in the message and determines that the registration requester is a user who accesses the network from a CS domain, and sends a multimedia authentication request message to the HSS. The message indicates the authentication scheme supported by the UE and the type of the access network, so that the HSS can obtain the corresponding authentication data.

Step 224: After receiving the request, the HSS determines that the user is a CS USIM user according to the user identity, and generates a corresponding quintuplet authentication vector (AV) for the user. If the HSS determines that the user accesses the network through a GSM BSS according to the access network and the UE supports the GSM AKA scheme, the HSS combines the CK and the IK into a Kc, indicates that the authentication scheme implemented by the network is Authentication and Key Agreement of Global System for Mobile communications—Circuit Switching (AKA-GSM-CS), and then returns the user information and the determined authentication scheme to the S-CSCF.

Step 225: After receiving an authentication response from the HSS, the S-CSCF removes the SRES parameter in the authentication vector (AV) and saves the authentication response. Afterward, the S-CSCF initiates an authentication challenge to the user by returning a 401 message to the RPF through the I-CSCF, and sets the "algorithm" parameter in the "WWW-Authenticate" header field to "AKA-GSM-CS" which is a network authentication scheme indicated by the HSS.

Step 226: After receiving the authentication challenge 401 message, the RPF generates a corresponding CS domain authentication request message and sends it to the UE through the BSS.

Step 227: According to the received authentication parameter, the UE calculates out the authentication result and returns it to the RPF through the BSS. If the network configuration requires a CS domain security process, the RPF initiates a second registration to the IMS network after receiving a "security protection completion" message. If the CS domain requires no security process, the RPF can initiate a second registration process to the IMS network after receiving a UE authentication response from the BSS.

Step 228: After receiving the second Register request forwarded by the I-CSCF, the S-CSCF compares the SRES sent from the UE with the SRES stored in the S-CSCF; if they are the same, the authentication succeeds, and the S-CSCF notifies the HSS of user registration success, downloads user data from the HSS and then returns a 200 OK message to the RPF. Depending on the inspection performed as against the iFC, the S-CSCF may initiate a third-party registration process to the AS.

Step 229: After receiving the 200 OK message, the RPF updates the stored user state, address information and registration timeout value, and returns a "location update acceptance" message to the UE, with the newly allocated TMSI carried in the message; afterward, the RPF sends a request to the S-CSCF to subscribe to the registration state notification of the user; after receiving the subscription request, the S-CSCF replies with a NOTIFY message which carries the user registration information, including all registered IMPUs that are not prohibited.

Step 2210: After completing the third-party registration at the S-CSCF, the AS retrieves the relevant user data from the HSS, and subscribes to user data change events.

Embodiment 10

Figure 22:
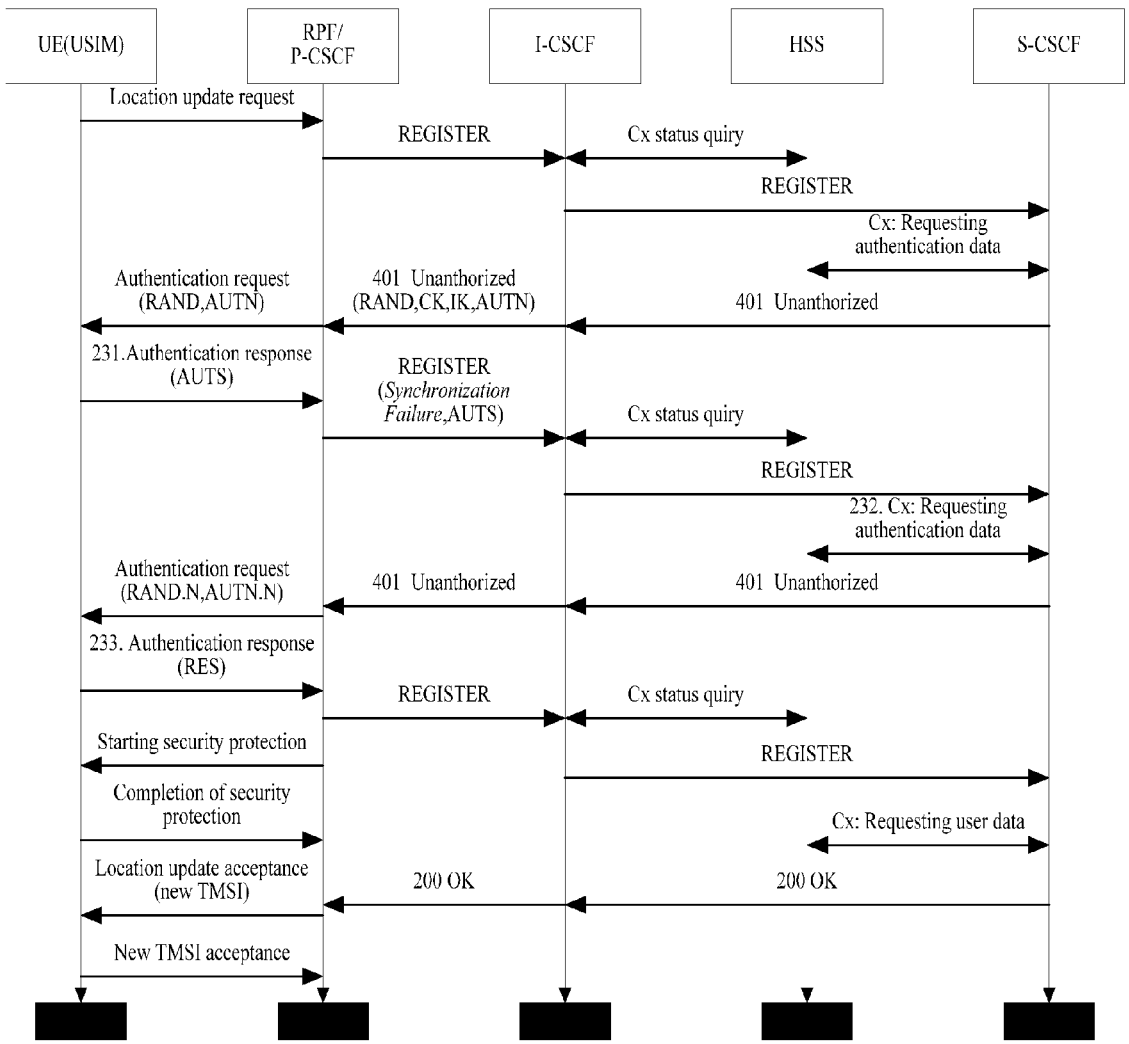
FIG. 22 is the fourth flowchart of the method according to an embodiment of the present invention in the second mode.

In the second mode, the process in which a mobile CS user fails to authenticate the network is shown in FIG. 22, which takes the WCDMA system as an example and simplifies the process of interaction with the RAN.

As shown in FIG. 22, the process in which a USIM card of a 3G terminal fails to authenticate the network when accessing the network through an RNS includes:

Step 231: After receiving an authentication request, the UE authenticates the network according to the RAND and the AUTN. If the calculated serial number is not acceptable to the UE, the UE calculates out the synchronization failure authentication token (AUTS) and returns it to the network, specifying the cause as synchronization failure.

Step 232: After receiving the AUTS from the UE, the S-CSCF requests the authentication data from HSS again, and the HSS updates its own data according to the calculated serial number range acceptable to the UE, generates authentication data again and returns the authentication data to the S-CSCF.

Step 233: The UE receives the new authentication data from the S-CSCF, and authenticates the network again. If the re-authentication succeeds, the subsequent process is the same as the process that follows successful initial authentication.

Embodiment 11

Figure 23:
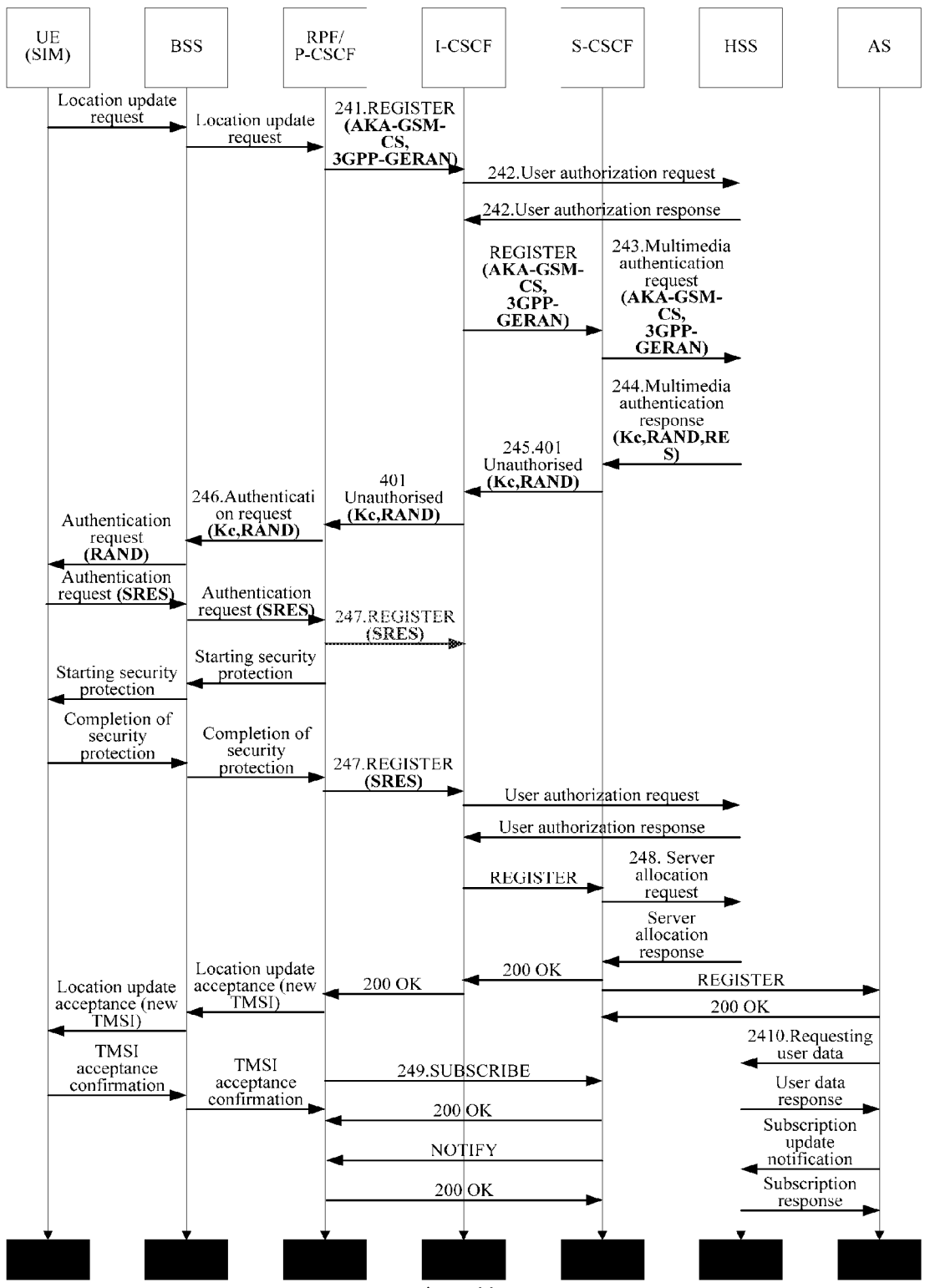
FIG. 23 is the fifth flowchart of the method according to an embodiment of the present invention in the second mode.

In the second mode, the initial registration process performed before a mobile CS user can access an IMS network is shown in FIG. 23, supposing a SIM card of a 2G terminal accesses the IMS network through a BSS.

As shown in FIG. 23, the initial registration process initiated by a SIM card of a 2G terminal to access the network through a BSS includes the following steps:

Step 241: After detecting the location update request sent by the UE, the RPF exports the ID required for registration to the IMS domain according to the CS domain ID of the CS user and resolves the home I-CSCF address according to the exported home domain name; afterward, the RPF sends a SIP Register message to the I-CSCF to register to the IMS network; the Register message should carry the extended parameter of the Authorization header field, for example, "auth-scheme", to indicate the authentication scheme that is supported by the UE and obtained by the RPF according to the CS signaling received from the BSS; the Register message also carries the access network information in the "P-Access-Network-Info" header field. In this embodiment, the access network is in a 3GPP-GERAN mode.

Step 242: According to the IMPU and IMPI of the user, the I-CSCF queries the HSS for the registration state of the user. If the HSS determines that the user is legal and unregistered, the HSS returns the S-CSCF capability information, and the I-CSCF selects an S-CSCF for handling the Register request. If the user is legal and registered, the HSS returns the S-CSCF address information, and the I-CSCF forwards the Register request message to the selected or returned S-CSCF address.

Step 243: After receiving the Register request message, the S-CSCF checks the user identity in the message and determines that the registration requester is a user who accesses the network from a CS domain, and indicates the authentication scheme supported by the UE and the type of the access network to the HSS. Therefore, the HSS can obtain the corresponding authentication data.

Step 244: After receiving the request, the HSS determines that the user is a CS SIM user according to the user identity. Therefore, the HSS generates a corresponding triplet authentication vector (AV) for the user, indicates that the authentication scheme implemented by the network is AKA-GSM-CS, and then returns the AV and the authentication scheme to the S-CSCF.

Step 245: After receiving an authentication response from the HSS, the S-CSCF removes the XRES parameter in the authentication vector (AV) and saves the authentication response. Afterward, the S-CSCF initiates an authentication challenge to the user by returning a 401 message to the RPF through the I-CSCF, and sets the "algorithm" parameter in the "WWW-Authenticate" header field in the message to "AKA-GSM-CS" which is a network authentication scheme indicated by the HSS.

Step 246: After receiving the authentication challenge 401 message, the RPF generates a corresponding CS domain authentication request message and sends it to the UE through the RNC.

Step 247: According to the received authentication parameter, the UE calculates out the authentication result and returns it to the RPF through the BSS. If the network configuration requires a CS domain security process, the RPF initiates a second registration to the IMS network after receiving a "security protection completion" message. If the CS domain requires no security process, the RPF can initiate a second registration process to the IMS network after receiving a UE authentication response from the BSS.

Step 248: After receiving the second Register request forwarded by the I-CSCF, the S-CSCF compares the SRES sent from the UE with the RES stored in the S-CSCF; if they are the same, the authentication succeeds, and the S-CSCF notifies the HSS of user registration success, downloads user data from the HSS and then returns a 200 OK message to the RPF. Depending on the inspection performed as against the iFC, the S-CSCF may initiate a third-party registration process to the AS.

Step 249: After receiving the 200 OK message, the RPF updates the stored user state, address information and registration timeout value, and returns a "location update acceptance" message to the UE, with the newly allocated TMSI carried in the message; afterward, the RPF sends a request to the S-CSCF to subscribe to the registration state notification of the user; after receiving the subscription request, the S-CSCF replies with a NOTIFY message which carries the user registration information, including all registered IMPUs that are not prohibited.

Step 2410: After completing the third-party registration at the S-CSCF, the AS retrieves the relevant user data from the HSS, and subscribes to user data change events.

Embodiment 12

Figure 24:
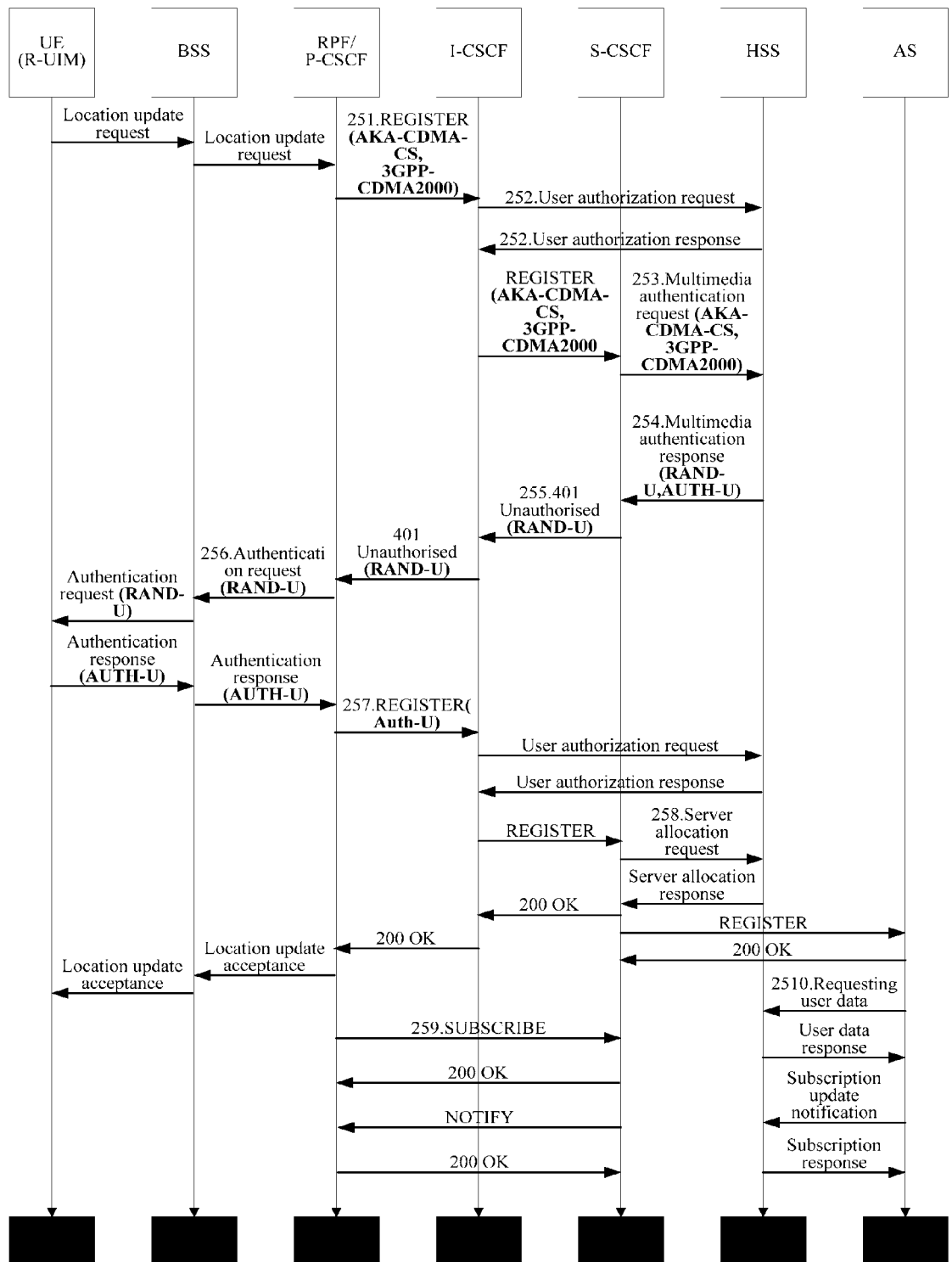
FIG. 24 is the sixth flowchart of the method according to an embodiment of the present invention in the second mode.

In the second mode, the initial registration process performed before a mobile CS user can access an IMS network is shown in FIG. 24. Supposing the process is applied to a CDMA system, the initial registration process initiated by an R-UIM card of a CDMA 2G terminal to access the network through a BSS includes the following steps:

Step 251: After detecting the location update request sent by the UE, the RPF exports the ID required for registration to the IMS domain according to the CS domain ID of the CS user and resolves the home I-CSCF address according to the exported home domain name; afterward, the RPF sends a SIP Register message to the I-CSCF to register to the IMS network; the Register message should carry the extended parameter of the Authorization header field, for example, "auth-scheme", to indicate the authentication scheme that is supported by the UE and obtained by the RPF according to the CS signaling received from the BSS; the Register message also carries the access network information in the "P-Access-Network-Info" header field. In this embodiment, the access network is in a 3GPP-CDMA2000 mode.

Step 252: According to the IMPU and IMPI of the user, the I-CSCF queries the HSS for the registration state of the user after receiving the Register message. If the HSS determines that the user is legal and unregistered, the HSS returns the S-CSCF capability information to the I-CSCF, and the I-CSCF selects an S-CSCF for handling the Register request according to the S-CSCF capability information. If the user is legal and registered, the HSS returns the S-CSCF address information, and the I-CSCF forwards the Register request message to the selected or returned S-CSCF address.

Step 253: After receiving the Register request message, the S-CSCF checks the user identity in the message and determines that the registration requester is a user who accesses the network from a CS domain, and indicates the authentication scheme supported by the UE and the type of the access network to the HSS. Therefore, the HSS can obtain the corresponding authentication data.

Step 254: After receiving the request, the HSS determines that the user is a CS R-UIM user according to the user identity. Therefore, the HSS generates a corresponding duplet authentication vector (AV) for the user, indicates that the authentication scheme implemented by the network is AKA-CDMA-CS, and then returns the AV and the authentication scheme to the S-CSCF.

Step 255: After receiving an authentication response from the HSS, the S-CSCF removes the Auth-U parameter in the authentication vector (AV) and saves the authentication response. Afterward, the S-CSCF initiates an authentication challenge to the user by returning a 401 message to the RPF through the I-CSCF, and sets the "algorithm" parameter in the "WWW-Authenticate" header field in the message to "AKA-CDMA-CS" which is a network authentication scheme indicated by the HSS.

Step 256: After receiving the authentication challenge 401 message, the RPF generates a corresponding CS domain authentication request message and sends it to the UE through the RNC.

Step 257: According to the received authentication parameter, the UE calculates out the authentication result and returns it to the RPF through the BSS. If the network configuration requires a CS domain security process, the RPF initiates a second registration to the IMS network after receiving a "security protection completion" message. If the CS domain requires no security process, the RPF can initiate a second registration process to the IMS network after receiving a UE authentication response from the BSS.

Step 258: After receiving the second Register request forwarded by the I-CSCF, the S-CSCF compares the Auth-U sent from the UE with the Auth-U stored in the S-CSCF; if they are the same, the authentication succeeds, and the S-CSCF notifies the HSS of user registration success, downloads user data from the HSS and then returns a 200 OK message to the RPF. Depending on the inspection performed as against the iFC, the S-CSCF may initiate a third-party registration process to the AS.

Step 259: After receiving the 200 OK message, the RPF updates the stored user state, address information and registration timeout value, and returns a "location update acceptance" message to the UE; afterward, the RPF sends a request to the S-CSCF to subscribe to the registration state notification of the user; after receiving the subscription request, the S-CSCF replies with a NOTIFY message which carries the user registration information, including all registered IMPUs that are not prohibited.

Step 2510: After completing the third-party registration at the S-CSCF, the AS retrieves the relevant user data from the HSS, and subscribes to user data change events.

Embodiment 13

Figure 25:
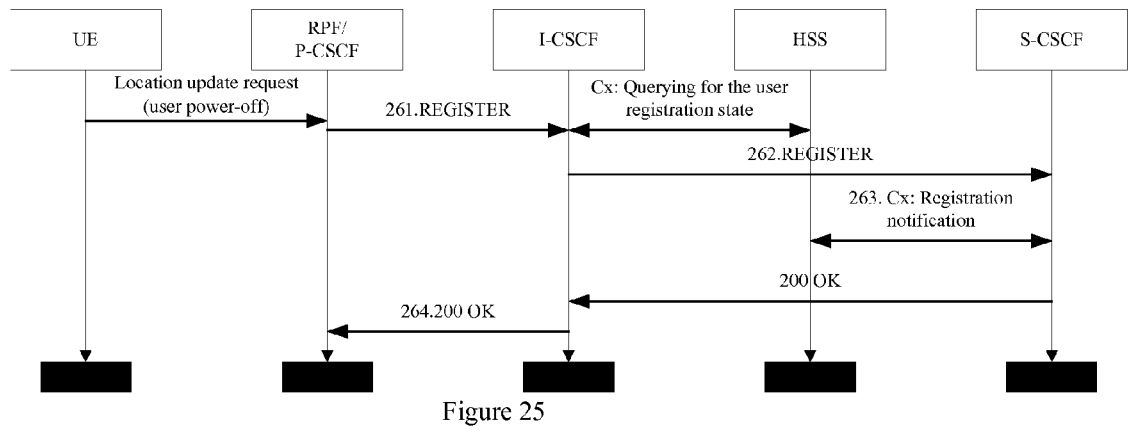
FIG. 25 is the seventh flowchart of the method according to an embodiment of the present invention in the second mode.

In the second mode, the deregistration process initiated by the user when a mobile CS user accesses an IMS network is shown in FIG. 25, supposing the RPF is combined with the P-CSCF.

As shown in FIG. 25, the initial registration process initiated by a USIM card of a 3G terminal to access the network through a BSS includes the following steps:

Step 261: When detecting a power-off event of a CS user, the RPF can initiate deregistration to the IMS network on behalf of the user. The parameters are the same as those in the initial registration except that the "expires" field after the "Contact" field is set to 0, which means that the user needs to be deregistered. According to the home domain name of the user, the RPF resolves the address of the home I-CSCF. Afterward, the RPF sends a SIP Register message.

Step 262: According to the IMPU and IMPI of the user, the I-CSCF queries the HSS for the registration state of the user. If the user is legal and registered, the HSS returns the S-CSCF address information; the I-CSCF forwards the Register request message to the selected or returned S-CSCF.

Step 263: Because the value of the "expires" field of the request is 0, the S-CSCF knows that the user needs to be deregistered. Therefore, the S-CSCF notifies the HSS to update the user registration state, namely, modifies the registration state of the user to the deregistered state, and returns a 200 OK message to the RPF.

Step 264: After receiving the 200 OK message, the RPF clears the user-related information stored in the RPF, thus completing deregistration of the user.

In conclusion, the technical solution under the present invention enables a mobile CS user to be registered to an IMS network so that the CS user can enjoy rich IMS services. The embodiments of the present invention make it practicable for an operator to unify and simplify the core network and reduce the operation cost effectively.

Although the present invention has been described through exemplary embodiments, the invention is not limited to such embodiments. It is apparent that those skilled in the art can make various modifications and variations to the invention without departing from the scope of the invention. The invention is intended to cover the modifications and variations provided that they fall in the scope of protection defined by the claims or their equivalents.

What is claimed is:

1. A system for a mobile Circuit Switched (CS) user to access an IP Multimedia Subsystem (IMS) network, comprising the IMS network for providing IMS services, and a CS access network, and further comprising:

a Register Proxy Function (RPF) entity, comprising a first interface for communicating with the IMS network and a second interface for communicating with the CS access network, and configured to map a CS registration event which is originated by the mobile CS user through the second interface to an IMS registration event, and initiate registration to the IMS network through the first interface on behalf of the mobile CS user;

wherein the configuration of the RFP entity to initiate registration to the IMS network through the first interface on behalf of the mobile CS user comprises at least one of:

configured to send the mapped IMS registration event to an IMS network entity wherein the IMS network entity is configured to perform IMS registration for the mobile CS user directly without authenticating the mobile CS user, and complete the registration process, if the IMS network entity determines that the registration is initiated by the mobile CS user; and configured to send the mapped IMS registration event to an IMS network entity wherein the IMS network entity is configured to perform IMS registration for the mobile CS user according to information carried in the mapped IMS registration event and complete the registration process, if the IMS network entity determines that the registration is initiated by the mobile CS user.

2. The system of claim 1, wherein the RPF entity comprises:

a registration event detecting unit, configured to detect the CS registration event initiated by the mobile CS user through the second interface;

a mapping unit, configured to map the registration event detected by the registration event detecting unit to the IMS registration event; and an IMS registering unit, configured to register to the IMS network on behalf of the mobile CS user through the first interface according to the mapping result of the mapping unit.

3. The system of claim 2, wherein the mapping unit further comprises an identity mapping unit, configured to map a CS domain ID of the mobile CS user to an IMS domain ID according to a predetermined mapping mode.

4. The system of claim 2, wherein the RPF entity comprises at least one of:

an IMS authenticating unit, configured to initiate authentication to an IMS domain on behalf of the mobile CS user;

a user registration event subscribing unit, configured to subscribe to user registration events on behalf of the mobile CS user;

a re-registration initiating unit, configured to re-register to the IMS network on behalf of the mobile CS user, or handle re-registration initiated by the IMS network for the mobile CS user;

a user deregistering unit, configured to deregister from the IMS network on behalf of the mobile CS user, or handle deregistration initiated by the IMS network for the mobile CS user; and a user handover event subscribing unit, configured to perform subscription to and notification of user handover events of the mobile CS user initiated by the IMS network entity.

5. The system of claim 1, wherein the RPF entity comprises a third interface for communicating with a CS subscription database of the mobile CS user; and through the third interface, the RPF entity is configured to perform registration and authentication in the CS domain on behalf of the mobile CS user.

6. A registration method for enabling a mobile Circuit Switched (CS) user to access an IP Multimedia Subsystem (IMS) network, comprising:

mapping, by a Register Proxy Function (RPF) entity, a CS registration event to an IMS registration event after detecting the CS registration event initiated by the mobile CS user; and initiating, by the RPF entity, a registration process to the IMS network through the IMS registration event;

wherein initiating the registration process to the IMS network through the IMS registration event comprises:

sending, by the RPF entity, the mapped IMS registration event to an IMS network entity wherein the IMS network entity is configured to perform IMS registration for the mobile CS user directly without authenticating the mobile CS user, and complete the registration process, if the IMS network entity determines that the registration is initiated by the mobile CS user;

or, sending, by the RPF entity, the mapped IMS registration event to an IMS network entity wherein the IMS network entity is configured to perform IMS registration for the mobile CS user according to information carried in the mapped IMS registration event, and complete the registration process, if the IMS network entity determines that the registration is initiated by the mobile CS user.

7. The method of claim 6, wherein the step of mapping the CS registration event to the IMS registration event comprises:

mapping, by the RPF entity, a power-on event to an IMS initial registration event after detecting the power-on event of the mobile CS user; or mapping, by the RPF entity, an initial location update event to an IMS initial registration event after detecting the initial location update event when the mobile CS user roams to a new location area; or mapping, by the RPF entity, a periodical location update event to an IMS re-registration event after detecting the periodical location update event of the mobile CS user; or mapping, by the RPF entity, a user power-off event to an IMS network deregistration event after detecting the power-off event of the mobile CS user.

8. The method of claim 6, wherein the step of mapping the CS registration event to the IMS registration event further comprises: converting a CS domain ID of the mobile CS user into an IMS domain ID; and/or mapping CS domain parameters to IMS domain parameters.

9. The method of claim 8, wherein the process of converting the CS domain ID of the mobile CS user into the IMS domain ID comprises:

generating a home domain name of corresponding IMS domain according to a mobile network code and a mobile country code in the International Mobile Subscriber Identity (IMSI) of the mobile CS user; and/or generating a temporary IP Multimedia Public Identity (IMPU) according to the IMSI of the mobile CS user; and/or obtaining a returned default IMPU as the default IMPU of the mobile CS user in the IMS network after registering the mobile CS user to the IMS network.

10. The method of claim 6, further comprising:

initiating, by the RPF entity, a CS registration process for the mobile CS user to a Home Location Register (HLR)

through an interface with the HLR, and mapping the CS registration event to the IMS registration event after the CS registration process is completed.

11. The method of claim 6, wherein the process of the IMS network entity determines that the registration is initiated by the mobile CS user in the step of initiating the registration process to the IMS network through the IMS registration event comprises:
 identifying, by the IMS network entity, that a registration requester is the mobile CS user according to a user identity in a Register request; or, identifying, by the IMS network entity, that a registration requester is the mobile CS user according to specific parameter values or a combination of different parameter values in a Register request.

12. The method of claim 6, wherein the step of performing IMS registration for the mobile CS user by the IMS network entity according to information carried in the mapped IMS registration event comprises:
 by a Serving-Call Session Control Function (S-CSCF) in the IMS network, sending a request message to a Home Subscriber Server (HSS) to obtain authentication information of the mobile CS user; by the HSS, generating an authentication vector (AV) for the mobile CS user according to the received request message, determining an authentication scheme supported by the network, and returning the authentication scheme to the S-CSCF; and
 by the S-CSCF, interacting with the mobile CS user to authenticate the mobile CS user according to the AV returned by the HSS and the authentication scheme supported by the network, allowing the mobile CS user to be registered to the IMS network after the authentication succeeds, and proceeding with the registration for the mobile CS user.

13. The method of claim 12, wherein the step of mapping the CS registration event to the IMS registration event comprises:
 by the RPF entity, mapping detected authentication capabilities supported by the mobile CS user to parameters in a Session Initiation Protocol (SIP) Register message, and initiating registration to the IMS network.

14. The method of claim 6, wherein the step of initiating the registration process to the IMS network through the IMS registration event further comprises:
 by the IMS network entities, updating registration state information of the mobile CS user and marking the mobile CS user as registered after completing the IMS registration process for the mobile CS user.

15. The method of claim 6, wherein the method comprises at least one of the following operations after the mobile CS user is registered in the IMS network successfully:
 by the RPF entity, subscribing to user registration events on behalf of the mobile CS user;
 by the RPF entity, re-registering to the IMS network on behalf of the mobile CS user;
 by the RPF entity, deregistering from the IMS network on behalf of the mobile CS user;
 by the RPF entity, handling deregistration for the mobile CS user initiated by the IMS network;
 by the RPF entity, handling re-registration for the mobile CS user initiated by the IMS network; and
 by the RPF entity, performing subscription to and notification of user handover events of the mobile CS user initiated by the IMS network entity.

16. A Register Proxy Function (RPF) entity, comprising a first interface for communicating with an IP Multimedia Subsystem (IMS) network and a second interface for communicating with a Circuit Switched (CS) access network, and specifically comprising:
 a registration event detecting unit, configured to detect a CS registration event initiated by a mobile CS user through the second interface;
 a mapping unit, configured to map the CS registration event detected by the registration event detecting unit to an IMS registration event; and
 an IMS registering unit, configured to register to the IMS network on behalf of the mobile CS user through the first interface according to the mapping result of the mapping unit;
 wherein the configuration of the IMS registering unit to register the IMS network on behalf of the mobile CS user through the first interface comprises at least one of:
 configured to send the mapped IMS registration event to an IMS network entity wherein the IMS network entity is configured to perform IMS registration for the mobile CS user directly without authenticating the mobile CS user, and complete the registration process, if the IMS network entity determines that the registration is initiated by the mobile CS user;
 and
 configured to send the mapped IMS registration event to an IMS network entity wherein the IMS network entity is configured to perform IMS registration for the mobile CS user according to information carried in the mapped IMS registration event and complete the registration process, if the IMS network entity determines that the registration is initiated by the mobile CS user.

17. The apparatus of claim 16, wherein the mapping unit further comprises an identity mapping unit, configured to map a CS domain ID of the mobile CS user to an IMS domain ID according to a predetermined mapping mode.

18. The apparatus of claim 16, comprising at least one of:
 an IMS authenticating unit, configured to initiate authentication to an IMS domain on behalf of the mobile CS user;
 a user registration event subscribing unit, configured to subscribe to user registration events on behalf of the mobile CS user;
 a re-registration initiating unit, configured to re-register to the IMS network on behalf of the mobile CS user, or handle re-registration initiated by the IMS network for the mobile CS user;
 a user deregistering unit, configured to deregister from the IMS network on behalf of the mobile CS user, or handle deregistration initiated by the IMS network for the mobile CS user; and
 a user handover event subscribing unit, configured to perform subscription to and notification of user handover events of the mobile CS user initiated by the IMS network entity.

19. The apparatus of claim 16, comprising a third interface for communicating with a CS subscription database of the mobile CS user, wherein the RPF entity is configured to perform registration and authentication to the CS domain on behalf of the mobile CS user through the third interface.

20. The apparatus of claim 16, wherein the PRF entity is set on a MSC/VLR entity that is located in the CS domain.

21. A registration method for enabling a mobile Circuit Switched (CS) user to access an IP Multimedia Subsystem (IMS) network, comprising:

mapping, by a Register Proxy Function (RPF) entity, a CS registration event to an IMS registration event after detecting the CS registration event initiated by the mobile CS user; and initiating, by the RPF entity, a registration process to the IMS network through the IMS registration event;

wherein initiating the registration process to the IMS network through the IMS registration event comprises sending, by the RPF entity, the mapped IMS registration event to an IMS network entity wherein the IMS network entity is configured to perform IMS registration for the mobile CS user and complete the registration process, if the IMS network entity determines that the registration is initiated by the mobile CS user.

22. A system for a mobile Circuit Switched (CS) user to access an IP Multimedia Subsystem (IMS) network, comprising the IMS network for providing IMS services, and a CS access network, and further comprising:

a Register Proxy Function (RPF) entity, comprising a first interface for communicating with the IMS network and a second interface for communicating with the CS access network, and adapted to map a CS registration event which is originated by the mobile CS user through the second interface to an IMS registration event, and initiate registration to the IMS network through the first interface on behalf of the mobile CS user;

wherein to initiate registration to the IMS network through the first interface on behalf of the mobile CS user, the RPF entity is configured to send the mapped IMS registration event to an IMS network entity wherein the IMS network entity is configured to perform IMS registration for the mobile CS user and complete the registration process, if the IMS network entity determines that the registration is initiated by the mobile CS user.

\* \* \* \* \*